United States Patent
Ciuperca

(10) Patent No.: US 10,071,503 B2
(45) Date of Patent: Sep. 11, 2018

(54) CONCRETE RUNWAYS, ROADS, HIGHWAYS AND SLABS ON GRADE AND METHODS OF MAKING SAME

(71) Applicant: Romeo Ilarian Ciuperca, Norcross, GA (US)

(72) Inventor: Romeo Ilarian Ciuperca, Norcross, GA (US)

( * ) Notice: Subject to any disclaimer, the term of this patent is extended or adjusted under 35 U.S.C. 154(b) by 59 days.

(21) Appl. No.: 15/243,373

(22) Filed: Aug. 22, 2016

(65) Prior Publication Data
US 2016/0356003 A1   Dec. 8, 2016
US 2018/0119369 A9   May 3, 2018

Related U.S. Application Data

(63) Continuation of application No. 14/833,201, filed on Aug. 24, 2015, now Pat. No. 9,421,695, which is a
(Continued)

(51) Int. Cl.
*B28B 1/14* (2006.01)
*E01C 23/03* (2006.01)
(Continued)

(52) U.S. Cl.
CPC ............ *B28B 1/14* (2013.01); *C04B 28/04* (2013.01); *C04B 28/08* (2013.01); *E01C 3/06* (2013.01); *E01C 7/14* (2013.01); *E01C 7/142* (2013.01); *E01C 7/36* (2013.01); *E01C 9/00* (2013.01); *E01C 9/001* (2013.01); *E01C 11/18* (2013.01); *E01C 23/03* (2013.01); *E04G 13/00* (2013.01); *E04G 21/246* (2013.01); *C04B 2111/0075* (2013.01); *C04B 2111/00612* (2013.01); *Y02W 30/92* (2015.05); *Y02W 90/00* (2015.05)

(58) Field of Classification Search
None
See application file for complete search history.

(56) References Cited

U.S. PATENT DOCUMENTS 2,053,135 A   9/1936 Dalton
2,158,732 A   5/1939 Shannon
(Continued)

FOREIGN PATENT DOCUMENTS

EP   2065530 A2   6/2009

OTHER PUBLICATIONS

U.S. Appl. No. 14/929,352, filed Nov. 1, 2015.
(Continued)

*Primary Examiner* — Benjamin A Schiffman
(74) *Attorney, Agent, or Firm* — Robert E. Richards; Richards IP Law

(57) ABSTRACT

The invention comprises a method of forming a slab on grade. The method comprises placing a first layer of insulating material horizontally on the ground and placing plastic concrete for a slab on grade on the first layer of insulating material. The plastic concrete is then formed into a desired shape having a top and sides. A second layer of insulating material is placed on the top of the plastic concrete and the first and second layers of insulating material are left in place until the concrete is at least partially cured. The second layer of insulating material is then removed. The product made by the method is also disclosed. A slab on grade is also disclosed.

20 Claims, 15 Drawing Sheets

Related U.S. Application Data continuation of application No. 14/165,630, filed on Jan. 28, 2014, now Pat. No. 9,114,549, which is a continuation of application No. 13/626,622, filed on Sep. 25, 2012, now Pat. No. 8,636,941.

(51) Int. Cl.

| | | |
|---|---|---|
| *C04B 28/08* | (2006.01) | |
| *C04B 28/04* | (2006.01) | |
| *E01C 7/14* | (2006.01) | |
| *E01C 9/00* | (2006.01) | |
| *E04G 21/24* | (2006.01) | |
| *E04G 13/00* | (2006.01) | |
| *E01C 11/18* | (2006.01) | |
| *E01C 3/06* | (2006.01) | |
| *E01C 7/36* | (2006.01) | |
| *C04B 111/00* | (2006.01) | |

(56) References Cited

U.S. PATENT DOCUMENTS

| | | |
|---|---|---|
| 3,199,828 A | 8/1965 | Newton |
| 3,418,776 A | 12/1968 | Manderbach et al. |
| 3,649,725 A | 3/1972 | Olson |
| 3,732,138 A | 5/1973 | Almog |
| 3,985,329 A | 10/1976 | Liegens |
| 4,052,031 A | 10/1977 | Melfi |
| 4,085,495 A | 4/1978 | Hebert |
| 4,090,336 A | 5/1978 | Carroll |
| 4,157,638 A | 6/1979 | Della-Donna |
| 4,191,521 A | 3/1980 | Muldery et al. |
| 4,349,398 A | 9/1982 | Kearns et al. |
| 4,351,873 A | 9/1982 | Davis |
| 4,370,840 A | 2/1983 | Bisbee et al. |
| 4,516,372 A | 5/1985 | Grutsch |
| 4,534,924 A | 8/1985 | Kariakin |
| 4,646,498 A | 3/1987 | Schneller et al. |
| 4,669,234 A | 6/1987 | Wilnau |
| 4,744,849 A | 5/1988 | Michaud-Soret |
| 4,765,109 A | 8/1988 | Boeshart |
| 4,811,927 A | 3/1989 | Slonimsky et al. |
| 4,841,702 A | 6/1989 | Huettemann |
| 4,866,897 A | 9/1989 | Yount |
| 4,885,888 A | 10/1989 | Young |
| 4,889,310 A | 12/1989 | Boeshart |
| 4,907,386 A | 3/1990 | Ekroth |
| 4,947,600 A | 8/1990 | Porter |
| 5,107,648 A | 4/1992 | Roby |
| 5,171,118 A | 12/1992 | Rothenbuhler |
| 5,217,339 A | 6/1993 | O'Connor et al. |
| 5,323,578 A | 6/1994 | Chagnon et al. |
| D357,855 S | 5/1995 | Keith et al. |
| 5,493,837 A | 2/1996 | Hepler |
| 5,497,592 A | 5/1996 | Boeshart |
| 5,570,550 A | 11/1996 | Roby |
| 5,606,832 A | 3/1997 | Keith et al. |
| 5,611,182 A | 3/1997 | Spude |
| 5,761,874 A | 6/1998 | Hayakawa |
| 5,765,318 A | 6/1998 | Michelsen |
| 5,792,552 A | 8/1998 | Langkamp et al. |
| 5,809,723 A | 9/1998 | Keith et al. |
| 5,809,725 A | 9/1998 | Cretti |
| 5,809,726 A | 9/1998 | Spude |
| 5,809,728 A | 9/1998 | Tremelling |
| 5,849,489 A | 10/1998 | McKinney |
| 5,836,126 A | 11/1998 | Harkenrider et al. |
| 5,966,885 A | 10/1999 | Chatelain |
| 5,976,670 A | 11/1999 | Fugazzi |
| 5,992,114 A | 11/1999 | Zelinsky et al. |
| 6,026,620 A | 2/2000 | Spude |
| 6,086,349 A | 7/2000 | Del Monte |
| 6,134,861 A | 10/2000 | Spude |
| 6,138,981 A | 10/2000 | Keith et al. |
| 6,234,736 B1 | 5/2001 | Miescher |
| 6,263,638 B1 | 7/2001 | Long, Sr. |
| 6,305,135 B1 | 10/2001 | Inaba |
| 6,314,694 B1 | 11/2001 | Cooper et al. |
| 6,360,505 B1 | 3/2002 | Johns |
| 6,426,029 B1 | 7/2002 | Hiscock et al. |
| 6,612,083 B1 | 9/2003 | Richards |
| 6,688,066 B1 | 2/2004 | Cottier et al. |
| 6,725,616 B1 | 4/2004 | Pease |
| 6,729,090 B2 | 5/2004 | Messenger et al. |
| 6,898,908 B2 | 5/2005 | Messenger et al. |
| 6,898,912 B2 | 5/2005 | Bravinski |
| 6,935,081 B2 | 8/2005 | Dunn et al. |
| 7,000,359 B2 | 2/2006 | Meyer |
| 7,398,131 B2 | 7/2008 | Trost et al. |
| 7,409,800 B2 | 8/2008 | Budge |
| 7,617,640 B2 | 11/2009 | Bradley |
| 7,765,761 B2 | 8/2010 | Paradis |
| 7,818,935 B2 | 10/2010 | Velickovic |
| 7,934,693 B2 | 5/2011 | Bravinski |
| 8,032,244 B2 | 10/2011 | Trost et al. |
| 8,277,931 B1 | 10/2012 | Kumar |
| 8,532,815 B1 | 9/2013 | Ciuperca |
| 8,555,583 B2 | 10/2013 | Ciuperca |
| 8,555,584 B2 | 10/2013 | Ciuperca |
| 8,636,941 B1 * | 1/2014 | Ciuperca .......... E01C 23/03 106/707 |
| 8,745,943 B2 | 6/2014 | Ciuperca |
| 8,756,890 B2 | 6/2014 | Ciuperca |
| 8,844,227 B1 | 9/2014 | Ciuperca |
| 8,855,803 B2 | 10/2014 | Ciuperca |
| 8,877,329 B2 | 11/2014 | Dunn et al. |
| 8,950,137 B2 | 2/2015 | Ciuperca |
| 8,951,460 B2 | 2/2015 | Ciuperca |
| 8,966,845 B1 | 3/2015 | Ciuperca |
| 9,003,740 B2 | 4/2015 | Ciuperca |
| 9,074,379 B2 | 7/2015 | Ciuperca |
| 9,114,549 B2 * | 8/2015 | Ciuperca .......... E01C 23/03 |
| 9,115,503 B2 | 8/2015 | Ciuperca |
| 9,145,695 B2 | 9/2015 | Ciuperca |
| 9,181,699 B2 | 11/2015 | Ciuperca |
| 9,290,939 B2 | 3/2016 | Ciuperca |
| 9,366,023 B2 | 6/2016 | Ciuperca |
| 9,458,637 B2 | 10/2016 | Ciuperca |
| 2002/0005725 A1 | 1/2002 | Scott |
| 2002/0092253 A1 | 7/2002 | Beliveau |
| 2003/0192272 A1 | 10/2003 | Bravinski |
| 2004/0040239 A1 | 3/2004 | Baillargeon |
| 2004/0129857 A1 | 7/2004 | Musk et al. |
| 2004/0252745 A1 | 12/2004 | Park et al. |
| 2005/0108985 A1 | 5/2005 | Bravinski |
| 2007/0062143 A1 | 3/2007 | Noushad |
| 2007/0095255 A1 | 5/2007 | Abbate et al. |
| 2007/0144110 A1 | 6/2007 | Aalbers et al. |
| 2007/0144653 A1 | 6/2007 | Padilla et al. |
| 2008/0041004 A1 | 2/2008 | Gibbar et al. |
| 2008/0313991 A1 | 6/2008 | Chouinard |
| 2008/0173788 A1 | 7/2008 | Brewka et al. |
| 2009/0202307 A1 | 8/2009 | Au et al. |
| 2009/0218474 A1 | 9/2009 | Bowman |
| 2009/0277103 A1 | 11/2009 | De Jaham |
| 2010/0062667 A1 | 3/2010 | Pan et al. |
| 2010/0162659 A1 | 7/2010 | Laprise |
| 2010/0192498 A1 | 8/2010 | Gleckman |
| 2010/0232877 A1 | 9/2010 | Sanvik et al. |
| 2010/0319295 A1 | 12/2010 | Nelson |
| 2011/0057090 A1 | 3/2011 | Spude et al. |
| 2011/0218261 A1 | 9/2011 | Loh et al. |
| 2012/0058299 A1 | 3/2012 | Serwin |
| 2013/0343734 A1 | 12/2013 | Dock, II et al. |
| 2014/0272302 A1 | 9/2014 | Ciuperca |
| 2014/0333004 A1 | 11/2014 | Ciuperca |
| 2014/0333010 A1 | 11/2014 | Ciuperca |
| 2015/0069647 A1 | 3/2015 | Ciuperca |

(56) References Cited

U.S. PATENT DOCUMENTS

2015/0069664 A1 3/2015 Ciuperca
2015/0266783 A1 9/2015 Ciuperca

OTHER PUBLICATIONS

U.S. Appl. No. 14/499,205, filed Sep. 28, 2014.
U.S. Appl. No. 14/531,644, filed Nov. 3, 2014.
U.S. Appl. No. 15/489,649, filed Apr. 17, 2017.
U.S. Appl. No. 15/243,373, filed Aug. 22, 2016.
U.S. Appl. No. 15/230,950, filed Aug. 8, 2016.
U.S. Appl. No. 14/788,153, filed Jun. 30, 2015.
U.S. Appl. No. 14/275,854, filed May 12, 2014.
U.S. Appl. No. 14/275,833, filed May 12, 2014.
U.S. Appl. No. 14/480,948, filed Sep. 9, 2014.
U.S. Appl. No. 14/480,967, filed Sep. 9, 2014.
U.S. Appl. No. 14/734,184, filed Jun. 9, 2015.
U.S. Appl. No. 15/168,133, filed May 30, 2016.
U.S. Appl. No. 15/436,985, filed Feb. 20, 2017.
U.S. Appl. No. 15/180,002, filed Jun. 11, 2016.
U.S. Appl. No. 15/218,729, filed Jul. 25, 2016.
U.S. Appl. No. 15/418,937, filed Jan. 30, 2017.

* cited by examiner

CONCRETE RUNWAYS, ROADS, HIGHWAYS AND SLABS ON GRADE AND METHODS OF MAKING SAME

CROSS-REFERENCE TO RELATED APPLICATIONS

The present application is a continuation of application Ser. No. 14/833,201 filed Aug. 24, 2015, now, U.S. Pat. No. 9,421,695, which is a continuation of application Ser. No. 14/165,630 filed Jan. 28, 2014, now U.S. Pat. No. 9,114,549, which is a continuation of application Ser. No. 13/626,622 filed Sep. 25, 2012, now U.S. Pat. No. 8,636,941.

FIELD OF THE INVENTION

The present invention generally relates to concrete slabs on grade, particularly airport runways and automotive roadways or highways. The present invention also relates to a concrete curing method of an accelerated concrete maturity or equivalent age of concrete, to achieve improved physical properties, such as greater compressive strength, flexural strength and modulus of rupture. More particularly, this invention relates to a system for curing concrete used to form runways, roads and highways.

BACKGROUND OF THE INVENTION

Concrete slabs on grade, and other concrete structures and objects, traditionally are made by building a form or a mold. The forms and molds are usually made from wood, plywood, metal and other structural members. Unhardened (plastic) concrete is placed into the space defined by opposed spaced form members. Once the concrete hardens sufficiently, although not completely, the forms are removed leaving a concrete wall or other concrete structure, structural member or concrete object exposed to ambient temperatures. For some applications, such as runways, roads and highways, slip forms are used to continuously place long lengths of concrete. For both conventional forms, molds and slip forms, the unprotected concrete slabs, structures or objects are exposed to the elements during the remainder of the concrete curing process after the forming process. The exposure of the concrete to the elements, especially temperature variations, often makes the curing of the concrete a slow process and the ultimate strength difficult to control or predict. To compensate for these losses, larger amounts of portland cement are used than otherwise would be necessary. Larger cement fractions, particularly for high surface area-to-volume ratio elements, such as these, can increase the likelihood of shrinkage, cracking, and curling.

The curing of plastic concrete requires two elements, water and heat, to fully hydrate the cementitious material. The curing of plastic concrete is an exothermic process. This heat is produced by the hydration of the portland cement, or other hydraulic cements, that make up the concrete. Initially, the hydration process produces a relatively large amount of heat. As the hydration process proceeds, less hydration occurs thereby resulting in the production of less heat. At the same time, moisture in the concrete is lost to the environment. If one monitors the temperature of concrete during the curing process, it produces a relatively large increase in temperature which then decreases over time. This chemical reaction is temperature dependent. That is, the hydration process, and consequently the strength gain, proceeds faster at higher temperature and slower at lower temperature. During conventional concrete curing, first, the heat is lost; then, moisture loss makes it difficult for the cementitious material to fully hydrate, and, therefore, the concrete may not achieve its maximum strength.

Concrete in conventional concrete forms or molds is typically exposed to the elements. Conventional forms or molds provide little insulation to the concrete contained therein. Concrete placed in forms for slabs on grade, roads, runways, and the like, is usually placed on a sheet of polyethylene placed on the ground first. Therefore, the bottom of the concrete slab is in contact with the ground, which absorbs the heat of hydration from the concrete. The top of the concrete slabs are sometimes covered with plastic sheathing to prevent some of the moisture loss to the environment. This also allows the concrete to lose the heat of hydration from the top of the slab surface to the air. Although during winter an insulated blanket may be placed on top of the concrete slab, road or runway to keep the concrete from freezing, heat produced within the concrete form or mold due to the hydration process usually is lost to the ground or to the air through a conventional concrete form or mold relatively quickly. Thus, the temperature of the plastic concrete may initially rise 20 to 40° C. or more above ambient temperature due to the initial hydration process and then fall relatively quickly to ambient temperature, such as within 12 to 36 hours. This initial relatively large temperature drop may result is concrete shrinkage, curling and/or concrete cracking. The remainder of the curing process is then conducted at approximately ambient temperatures, because the relatively small amount of additional heat produced by the remaining hydration process is relatively quickly lost to the ground or to the air through the uninsulated concrete form or mold. The concrete is therefore subjected to the hourly or daily fluctuations of ambient temperature from hour-to-hour, from day-to-night and from day-to-day. Curing concrete under ambient temperature conditions is not as significant a problem during summer temperature. It is cool or cold weather conditions that cause the most significant trouble for properly curing concrete.

Failure to cure concrete under ideal temperature and moisture conditions affects the ultimate strength and durability of the concrete. In colder weather, concrete work may even come to a halt since concrete will freeze, or not gain much strength at all, at relatively low temperatures. By definition (ACI 306), cold weather conditions exist when " . . . for more than 3 consecutive days, the average daily temperature is less than 40 degrees Fahrenheit and the air temperature is not greater than 50 degrees Fahrenheit for more than one-half of any 24 hour period." Therefore, in order for hydration to take place, the temperature of concrete must be above 40° F.; below 40° F., the hydration process slows and at some point may stop altogether. It is typically recommended that concrete by moisture cured for 28 days to fully hydrate the concrete. However, this is seldom possible to achieve in commercial practice.

Insulated concrete form systems are known in the prior art and typically are made from a plurality of modular form members. U.S. Pat. Nos. 5,497,592; 5,809,725; 6,668,503; 6,898,912 and 7,124,547 (the disclosures of which are all incorporated herein by reference) are exemplary of prior art modular insulated concrete form systems. Full-height insulated concrete forms are also known in the prior art. U.S. Patent Application Publication No. 2011/0239566 and U.S. Pat. No. 8,756,890 (the disclosure of which are both incorporated herein by reference in their entirety) discloses a full-height vertical insulated concrete form. Insulated concrete forms reduce the heat transmission to and from the concrete within such forms. However, vertical insulated concrete forms are not useful for forming slabs on grade, such as runways, road and highways and previously have not been proposed to be used in such applications.

Concrete insulating blankets are known in the art. Electrically heated insulating blankets are also known in the prior art, such as those disclosed in U.S. Pat. Nos. 7,183,524 and 7,230,213. Such concrete insulating blankets and electrically heated insulating blankets are known for use in northern climates for thawing frozen ground and/or preventing curing concrete from freezing. It is known that plastic concrete will not cure satisfactorily at temperature below 50° F. However, such electrically heated blankets are designed to provide a constant amount of heat to the plastic concrete and are used only for the purpose of preventing the concrete from freezing in cold weather.

Therefore, it would be desirable to produce a concrete forming or molding system for slabs on grade, such as runways, road and highways. It would also be desirable to provide a concrete curing system can be used specifically to cure slabs on grade, such as runways, roads and highways. It would also be desirable to provide a concrete curing system that accelerates concrete maturity or equivalent age to achieve improved concrete strength, particularly early concrete strength. Furthermore, it would be desirable to provide a concrete curing system for slabs on grade, such as runways, roads and highways, so that the concrete cures more quickly, is less permeable, more flexible, stronger, more durable and less prone to cracking and curling. It would also be desirable to produce concrete slabs on grade, such as runways, roads and highways, that are more environmentally friendly.

SUMMARY OF THE INVENTION

The present invention satisfies the foregoing needs by providing an improved concrete curing system to fully hydrate the cementitious material in the early stages of curing before the moisture is lost from the concrete by retaining the heat of hydration from the concrete curing process.

In one disclosed embodiment, the present invention comprises a method. The method comprises placing a first layer of insulating material horizontally on the ground and placing plastic concrete for a slab on grade on the first layer of insulating material. The plastic concrete is then formed into a desired shape having a top and sides. A second layer of insulating material is placed on the top and sides of the plastic concrete and the first and second layers of insulating material are left in place until the concrete is at least partially cured. The second layer of insulating material is then removed.

In another disclosed embodiment, the present invention comprises a slab on grade. The slab on grade comprises a first horizontal layer of insulating material, a second horizontal layer of insulating material and a quantity of plastic concrete disposed between the first and second layers of insulating material.

Accordingly, it is an object of the present invention to provide an improved slab on grade, such as airport runways, roads and automotive highways.

Another object of the present invention to provide an improved method for constructing slabs on grade, specifically, runways, roads and highways.

Another object of the present invention is to provide a slab on grade that is more environmentally friendly.

A further object of the present invention is to provide a system for curing concrete slabs on grade, such as airport runways, roads and automotive highways.

Another object of the present invention is to provide a concrete slab on grade that has improved physical properties, such as less permeable, greater flexural strength, greater compressive strength, greater modulus of rupture and greater durability.

A further object of the present invention is to provide a concrete slab on grade curing system that uses reduced amounts of portland cement while producing concrete having an ultimate strength equivalent to, or better than, concrete made with conventional amounts of portland cement.

Yet another object of the present invention is to provide a system for curing concrete slabs on grade such that the concrete develops its maximum durability.

Another object of the present invention is to provide a system for curing concrete slabs on grade such that concrete mixes containing reduced amounts of portland cement can be cured efficiently and effectively while having compressive strengths and flexural strengths and modulus of rupture equivalent to or better than conventional concrete mixes.

A further object of the present invention is to provide a concrete curing system that produces a concrete with a more refined structure or microstructure.

Another object of the present invention is to provide a system for curing concrete slabs on grade more quickly.

A further object of the present invention is to provide an accelerated concrete curing system to improve the maturity and equivalent age for any type of concrete formulation, especially concrete formulations that use relatively large amounts of recycled industrial waste material, such as slag cement, fly ash, silica fume and the like, to be used in concrete slabs and pavements such as roads and runways.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
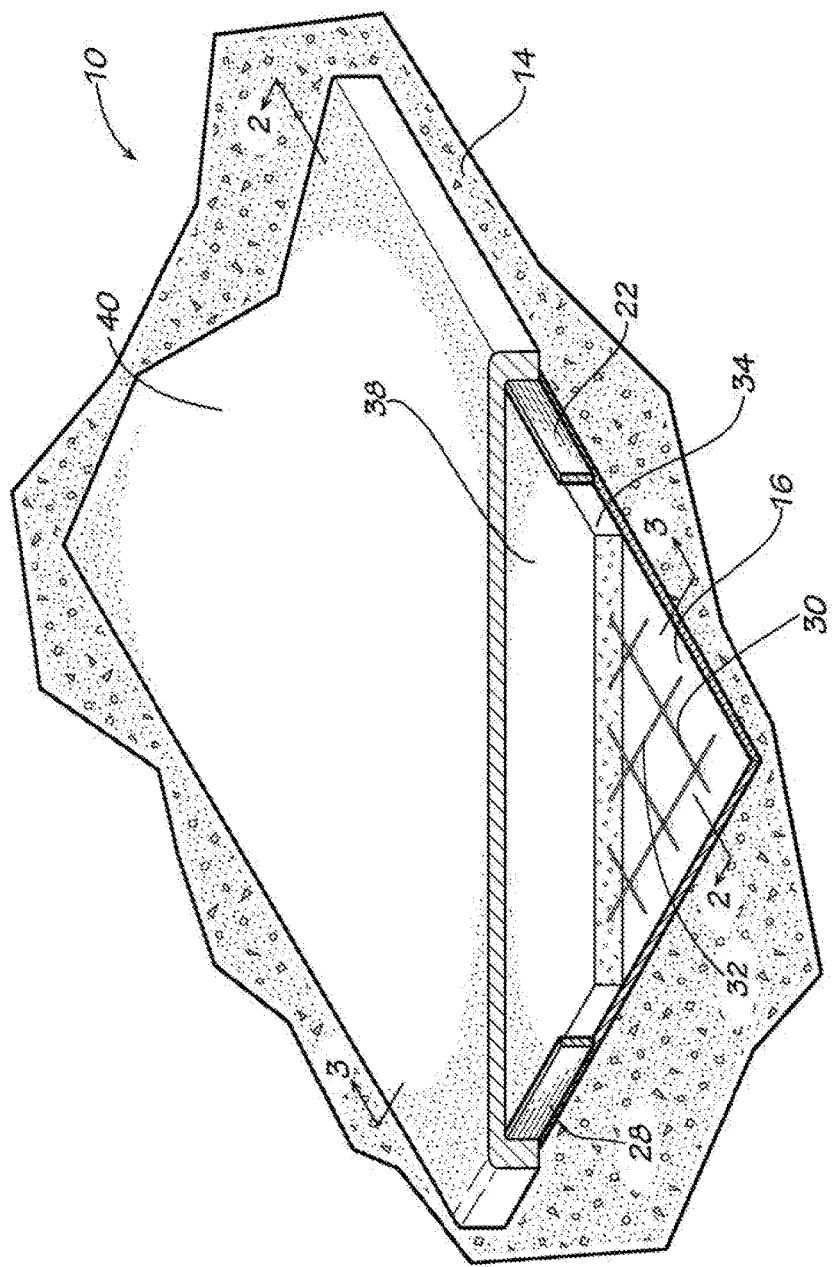
FIG. 1 is the perspective view of a disclosed embodiment of an insulated concrete form in accordance with the present invention.

Referring now to the drawing in which like numbers indicate like elements throughout the several views, there is shown in FIG. 1 a disclosed embodiment of a concrete slab on grade 10, such as used for an airport runway, a road or an automotive highway. The slab on grade can also be used for a basement slab, a commercial slab floor or any other horizontal concrete structure or object constructed on the ground. Before the slab on grade 10 is placed, the ground 12 is excavated to a desired depth. Usually, a bed of aggregate 14 is established below the slab on grade 10 to be constructed. The slab on grade 10 is constructed by first placing on the bed of aggregate 14 a layer of insulating material 16 (i.e., the bottom layer of insulating material). The layer of insulating material 16 insulates the bottom surface of the slab on grade 10 and helps retain the heat of hydration and the moisture within the concrete during the curing process.

The layer of insulating material 16 can be a material that insulates against conductive heat loss, a radiant heat reflective material or both. The layer of insulating material 16 can be made from any insulating material that provides sufficient insulating and mechanical properties. However, the layer of insulating material 16 preferably is made from a close cell polymeric foam material, such as molded expanded polystyrene or extruded expanded polystyrene. Other closed cell polymeric foams can also be used, such as polyisocyanurate, polethylene or polyurethane. If the layer of insulating material 16 is made from polymeric foam, it should have a density sufficient to make it substantially rigid, such as approximately 1 to approximately 3 pounds per cubic foot, preferably approximately 1.5 pounds per cubic foot, or it can be a flexible polymeric foam, such as having a density of less than 1 pound per cubic foot. High density expanded polystyrene is available under the trademark Neopor® and is available from Georgia Foam, Gainesville, Ga. The layer of insulating material 16 can be made by molding to the desired size and shape, by cutting blocks or sheets of pre-formed extruded expanded polystyrene into a desired size and shape or by extruding the desired shape and then cutting to the desired length. If the layer of insulating material 16 is made from a material other than expanded polystyrene foam, it should have insulating properties equivalent to at least 0.5 inches of expanded polystyrene foam; preferably, at least 1 inch of expanded polystyrene foam; more preferably at least 2 inches of expanded polystyrene foam; especially at least 3 inches of expanded polystyrene foam; most especially, at least 4 inches of expanded polystyrene foam. There is no maximum thickness for the equivalent expanded polystyrene foam useful in the present invention. The maximum thickness is usually dictated by economics, ease of handling and building or structure design. However, for most applications a maximum equivalence of 8 inches of expanded polystyrene foam can be used. In another embodiment of the present invention, the layer of insulating material 16 has insulating properties equivalent to approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the layer of insulating material 16 used in another disclosed embodiment of the present invention has insulating properties equivalent to approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layer of insulating material 16 should have an R-value of greater than 1.5, preferably greater than 4, more preferably greater than 8, especially greater than 12. The layer of insulating material 16 preferably has an R-value of approximately 1.5 to approximately 40; more preferably between approximately 4 to approximately 40; especially approximately 8 to approximately 40; more especially approximately 12 to approximately 40. The layer of insulating material 16 preferably has an R-value of approximately 1.5, more preferably approximately 4, most preferably approximately 8, especially approximately 20, more especially approximately 30, most especially approximately 40. Of course, different amounts of insulation or different amounts of equivalent insulation can be used above and below a horizontal concrete slab in accordance with the present invention, as design requirement may require.

Alternatively, the layer of insulating material 16 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various forms including, but not limited to, bulk fiber, foam, blanket, board, felt and paper form. Refractory insulating material is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulating material is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties. However, refractory insulating material useful in the present invention can range from 1/32 inch to 2 inches.

Alternatively, the layer of insulating material 16 is a sheet of radiant heat reflective material, such as a metal foil, especially aluminum foil. A preferred radiant heat reflective material is a metalized polymeric film, more preferably, metalized biaxially-oriented polyethylene terephthalate film, especially aluminized biaxially-oriented polyethylene terephthalate film. Biaxially-oriented polyethylene terephthalate film is commercially available under the designation Mylar®, Melinex® and Hostaphen®. Mylar® film is typically available in thicknesses of approximately 1 mil or 2 mil. Aluminized Mylar® film is commercially available from the Cryospares division of Oxford Instruments Nanotechnology Tools Ltd., Abingdon, Oxfordshire, United Kingdom and from New England Hydroponics, Southampton, Mass., USA. Another preferred material is metalized plastic bubble pack-type insulating material or metalized closed cell polymeric foam. Such material is commercially available as Space Age® reflective insulation from Insulation Solutions, Inc., East Peoria, Ill. 61611. The Space Age® product is available as two layers of polyethylene air bubble pack sandwiched between one layer of white polyethylene and one layer of reflective foil; two layers air bubble pack sandwiched between two layers of reflective foil; or a layer of closed cell polymeric foam (such as high density polyethylene foam) disposed between one layer of polyethylene film and one layer of reflective foil. All three of these Space Age® product configurations are useful in the present invention for the layer of insulating material 16. If the layer of insulating material 16 is a sheet of aluminized Mylar® film, it also provides an excellent vapor barrier. This sheet of radiant heat reflective material can be used where it is impossible or impractical to use foam insulation on the bottom surface of the concrete slab on grade.

Preferably the layer of insulating material 16 is made from both a layer of radiant heat reflective material and either a layer of polymeric foam or a layer of refractory insulating material. Thus, the layer of insulating material 16 is made from a layer of aluminum foil and a layer of expanded polystyrene foam or a layer of ceramic fiber insulating material, such as Wollastonite. Most preferably, the layer of insulating material 16 is made from three layers: a layer of a radiant heat reflective material, a layer of polymeric foam and a layer of refractory insulating material. For example, the layer of insulating material 16 can be made from a layer of aluminum foil, a layer of expanded polystyrene foam and a layer of ceramic fiber insulating material, such as Wollastonite.

Figure 2:
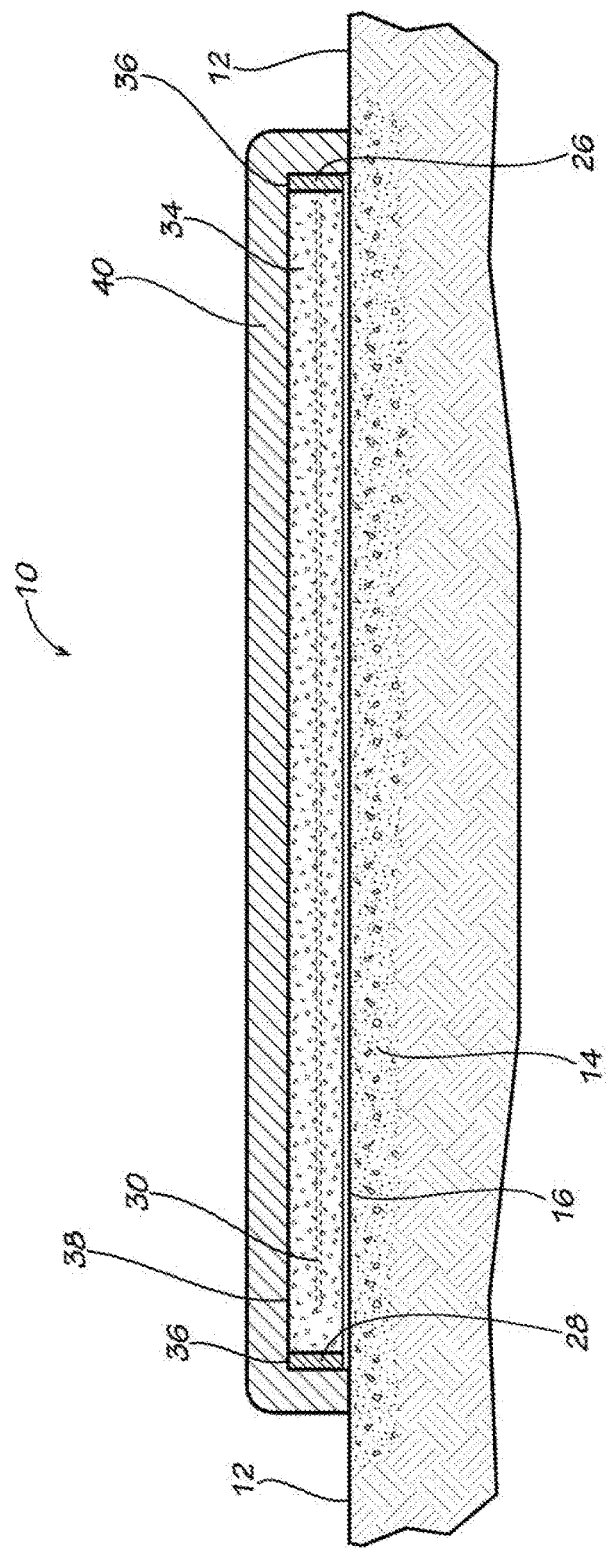
FIG. 2 is the cross-sectional view of the insulated concrete form shown in FIG. 1 taken along the line 2-2.
Figure 3:
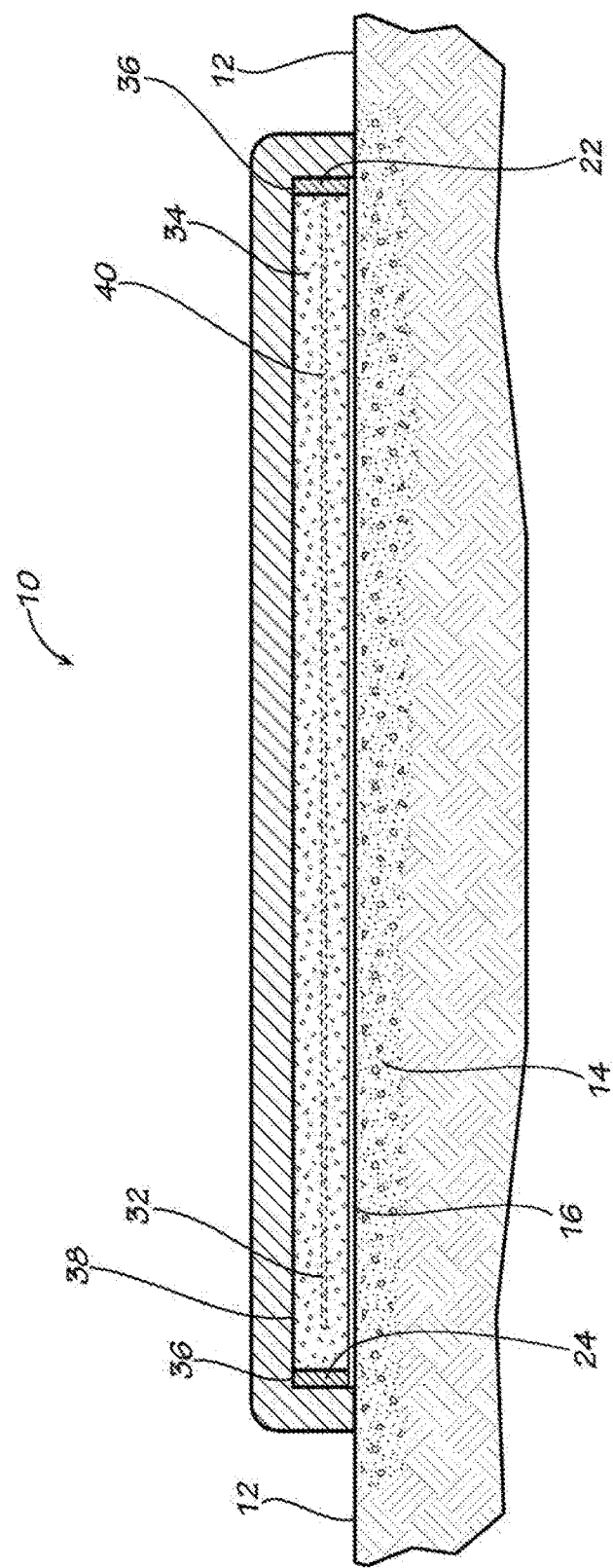
FIG. 3 is the cross-sectional view of the insulated concrete form shown in FIG. 1 taken along the line 3-3.

The slab on grade 10 can be made using a conventional wood or metal concrete form, as shown in FIGS. 1-3, or it can be formed using a slip form. Concrete formed using a slip form involves a machine that forms the concrete on a continuous basis. Therefore, after the slip form machine forms the concrete, the formed concrete slab on grade 20 remains, such as shown in FIGS. 4-6.

If a conventional concrete form is used, it can be constructed on the layer of insulating material 16 or the concrete form can be constructed on the bed of aggregate 14 and the layer of insulating material 16 can be placed on the bed of aggregate within the concrete form. As shown in FIGS. 1-3, a conventional concrete form comprises two longitudinal side form members 22, 24 and two transverse side form members 26, 28. Collectively, the side form members 22-28 form a rectangular form or mold for receiving plastic concrete. Although the concrete form is illustrated as having a four-sided rectangular shape, it is specifically contemplated that the concrete form can be of any size or shape.

An optional rebar grid, including the rebar 30 and 32, is then constructed in a conventional manner within the side form members 22-28. Rebar chairs (not shown) can be used to position the rebar grid at a desired height within the concrete slab. After a rebar grid is constructed within the side form members 22-28, the form is filled with plastic concrete 34. Sufficient plastic concrete 34 is placed in the form such that the plastic concrete in the form reaches the top 36 of the side form members 22-28. The top surface 38 of the plastic concrete 34 is then finished in any desired conventional manner, such as by troweling, or to provide other types of architectural finishes or patterns.

Figure 4:
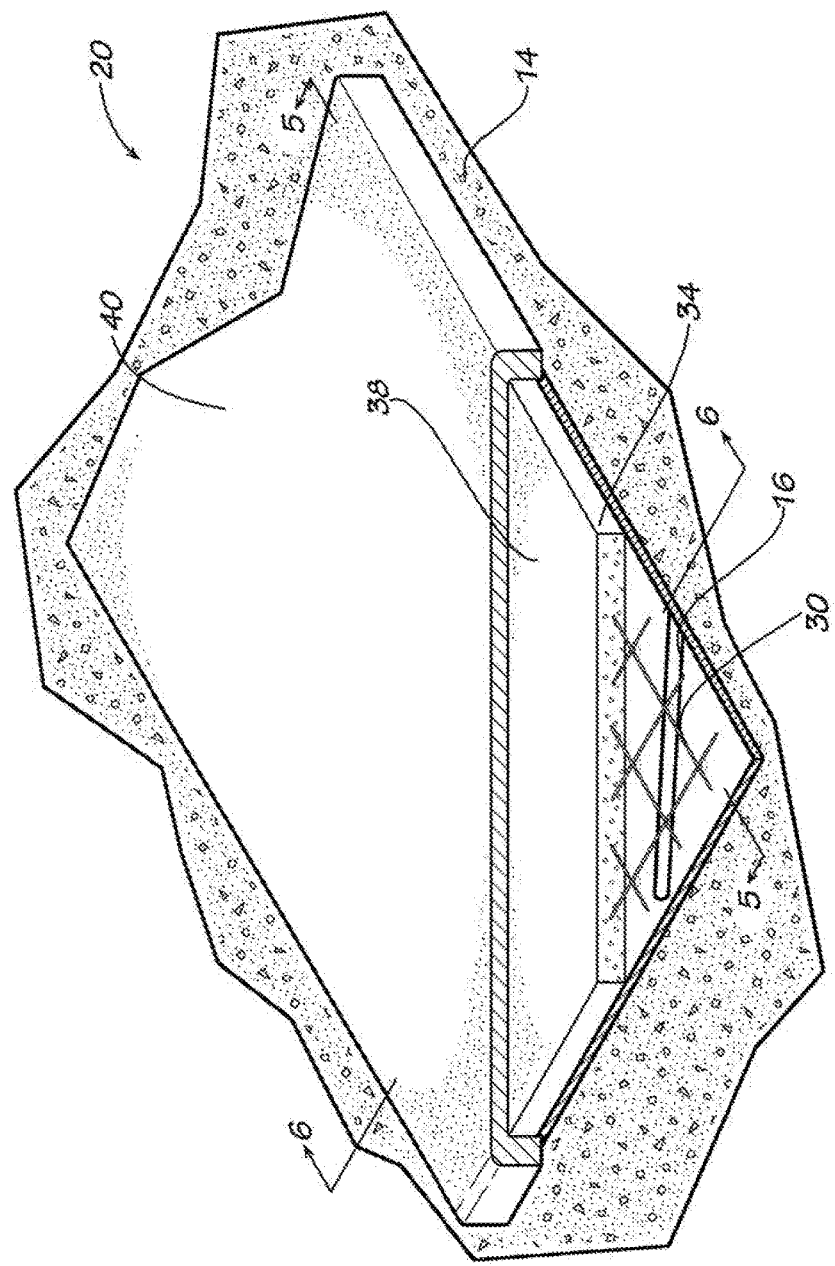
FIG. 4 is the perspective view of another disclosed embodiment of an insulated concrete form in accordance with the present invention.
Figure 5:
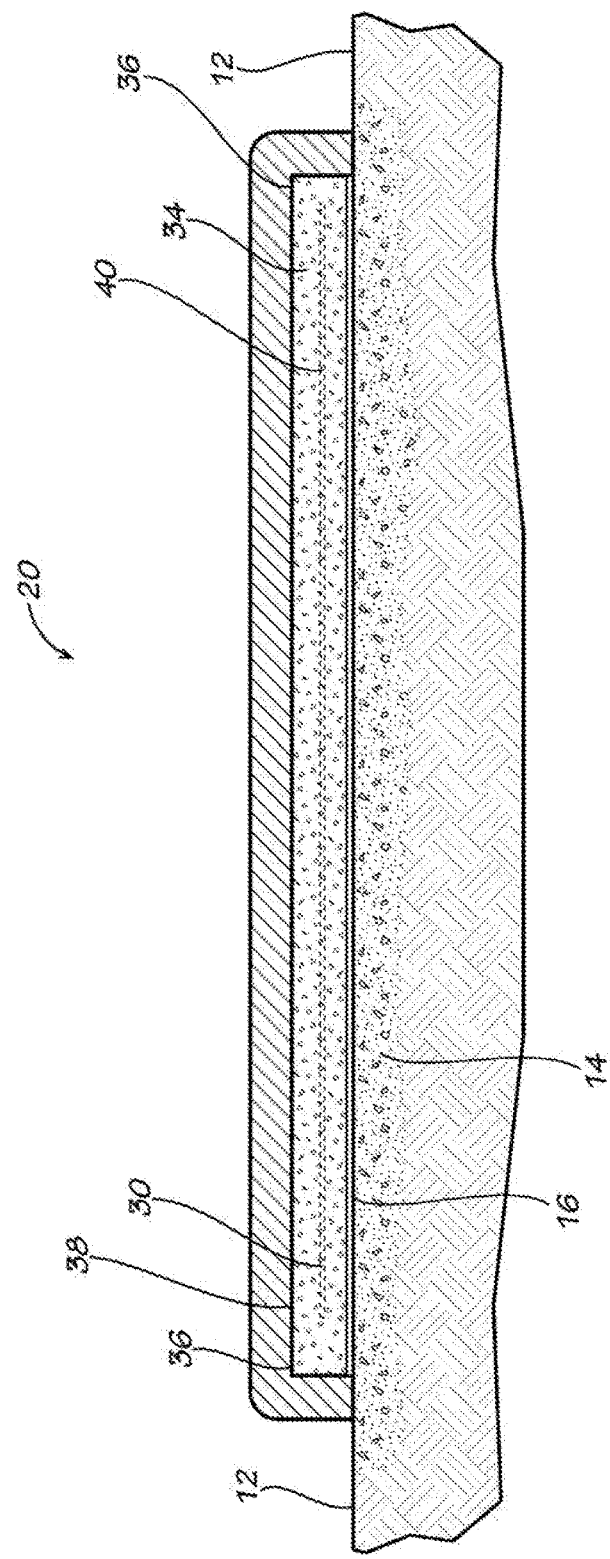
FIG. 5 is the cross-sectional view of the insulated concrete form shown in FIG. 4 taken along the line 5-5.
Figure 6:
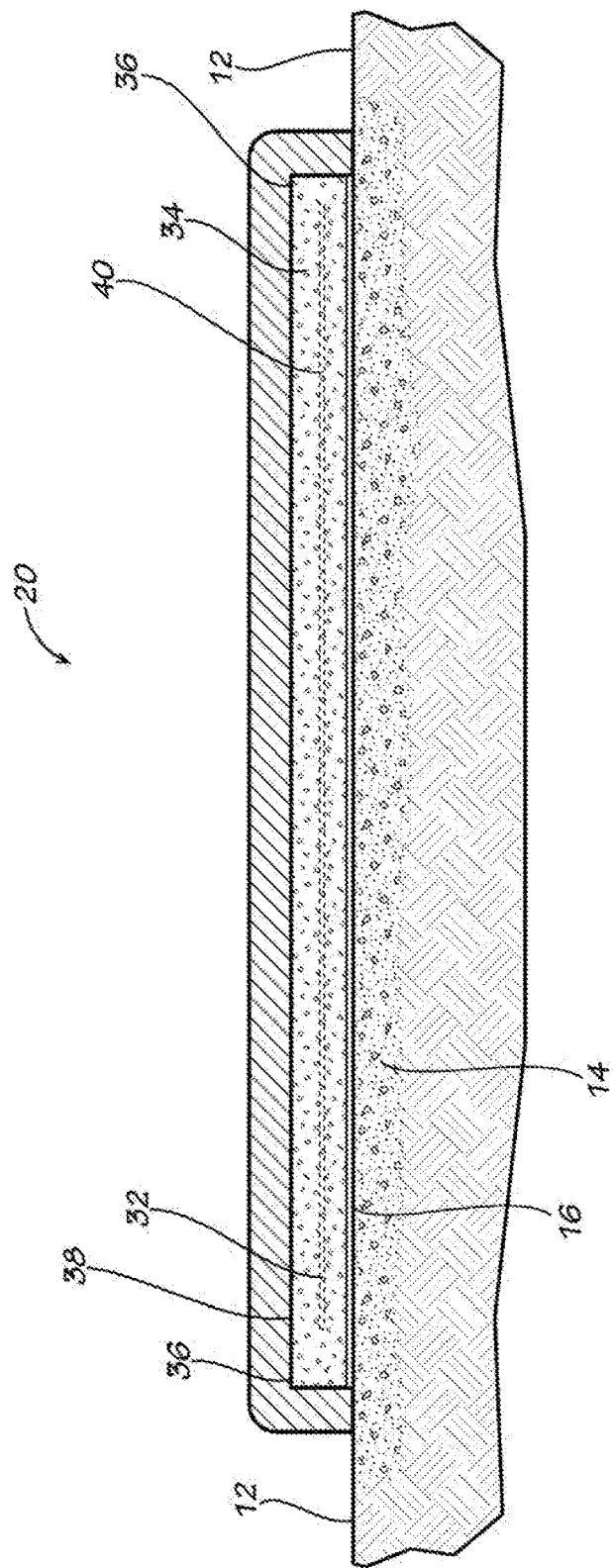
FIG. 6 is the cross-sectional view of the insulated concrete form shown in FIG. 4 taken along the line 6-6.

As shown in FIGS. 4-6, the concrete slab on grade 20 has been formed using a slip form, which leaves no conventional forms, like the side forms 22-28, behind. Thus, after the slip form has formed the concrete, only the shaped concrete slab on grade is left behind, as can be seen in FIGS. 4-6.

After the plastic concrete in the form has been finished, a layer of insulating material 40 (i.e., the top layer of insulating material) is placed on the top 36 of the side form members 22-28 and the top surface 38 of the finished plastic concrete 34, as shown in FIGS. 1-3, or simply on the top 38 and sides of the formed plastic concrete 34, as shown in FIGS. 4-6. The layer of insulating material 40 can be made from the same material and can have the same insulating properties as the layer of insulating material 16 disclosed above. Alternatively, the layer of insulating material 40 can be made from different material and can have different insulating properties than the layer of insulating material 16 disclosed above. The layer of insulating material 40 can also be a concrete insulating blanket or an electrically heated concrete blanket. If an electrically heated concrete blanket is used, it should be operated in the manner disclosed in U.S. Pat. No. 8,532,815.

In cold weather conditions and/or for concrete employing relatively high amounts of slag cement and/or fly ash as disclosed below, it is preferably to use an electrically heated concrete blanket as the layer of insulating material 40.

The layer of insulating material 40 is left on the plastic concrete 34 until the plastic concrete is at least partially cured. The time necessary for the concrete 34 to achieve a desired amount or degree of cure will vary depending on many factors, including the type of concrete mix used, ambient temperatures, thickness of the concrete, and the like. However, the concrete 34 will generally achieve sufficient strength within approximately four hours to seven days. By using the bottom layer of insulating material 16 and the top layers of insulating material 40 (or a concrete insulating blanket or electrically heated concrete blanket) in accordance with the present invention, the concrete 34 will cure faster and will achieve an accelerated maturity or equivalent age with the corresponding greater early strength more quickly than prior art systems. The layer of insulating material 16 and the layer of insulating material 40 (or a concrete insulating blanket or electrically heated concrete blanket) in accordance with the present invention also results in less plastic concrete shrinkage, thereby reducing cracking, shrinkage and curling of the finished concrete. These benefits make the concrete slab on grade in accordance with the present invention stronger; i.e., greater compressive strength and greater flexural strength more quickly. By retaining the water in the concrete mix and since that space is insulated by the top and bottom layers of insulating material 16, 40, the heat of hydration of the curing concrete is retained therein and sufficient water is present such that the concrete will achieve an accelerated maturity or equivalent age and therefore its maximum potential hardness more quickly, thereby producing stronger concrete.

While the present invention can be used with conventional concrete mixes; i.e., concrete in which portland cement is the only cementitious material used in the concrete, it is preferred as a part of the present invention to use the concrete or mortar mixes disclosed in U.S. Pat. No. 8,545,749 (the disclosures of which is incorporated herein by reference in its entirety). Specifically, the concrete mix in accordance with the present invention comprises cementitious material, aggregate and water sufficient to hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lb s/yd$^3$ of concrete (177 kg/m$^3$) to 1,100 lb s/yd$^3$ of concrete (650 kg/m$^3$) of concrete. The water-to-cement ratio by weight is usually approximately 0.25 to approximately 0.7. Relatively low water-to-cement ratios lead to higher strength but lower workability, while relatively high water-to-cement ratios lead to lower strength, but better workability. Aggregate usually comprises 70% to 80% by volume of the concrete. However, the relative amount of cementitious material to aggregate to water is not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more.

The aggregate used in the concrete used with the present invention is not critical and can be any aggregate typically used in concrete. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The reinforcement of the concrete used with the present invention is not a critical aspect of the present invention and thus any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement; preferably portland cement and one of slag cement or fly ash; and more preferably portland cement, slag cement and fly ash. Slag cement is also known as ground granulated blast-furnace slag (GGBFS). The cementitious material preferably comprises a reduced amount of portland cement and increased amounts of recycled supplementary cementitious materials; i.e., slag cement and/or fly ash. This results in cementitious material and concrete that is more environmentally friendly. The portland cement can also be replaced, in whole or in part, by one or more cementitious materials other than portland cement, slag cement or fly ash. Such other cementitious or pozzolanic materials include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. The portland cement can also be replaced, in whole or in part, by one or more inert or filler materials other than portland cement, slag cement or fly ash. Such other inert or filler materials include, but are not limited to limestone powder; calcium carbonate; titanium dioxide; quartz; or other finely divided minerals that densify the hydrated cement paste.

The preferred cementitious material of the present invention comprises 0% to approximately 80% by weight portland cement. The range of 0% to approximately 80% by weight portland cement includes all of the intermediate percentages; namely, 5%, 10%, 15%, 20%, 25%, 30%, 35%, 40%, 45%, 50%, 55%, 60%, 65%, 70%, and 75%. The cementitious material of the present invention can also comprise 0% to approximately 70% by weight portland cement, preferably 0% to approximately 60% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. Thus, in another disclosed embodiment of the present invention, the cementitious material can comprise approximately 5%, approximately 10%, approximately 15%, approximately 20%, approximately 25%, approximately 30%, approximately 35%, approximately 40%, approximately 45% or approximately 50% by weight portland cement or any sub-combination thereof.

The preferred cementitious material for use in one disclosed embodiment of the present invention also comprises 0% to approximately 90% by weight slag cement, preferably approximately 10% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

The preferred cementitious material for use in one disclosed embodiment of the present invention also comprises 0% to approximately 80% by weight fly ash, preferably approximately 10% to approximately 80% by weight fly ash, preferably approximately 10% to approximately 75% by weight fly ash, preferably approximately 10% to approximately 70% by weight fly ash, preferably approximately 10% to approximately 65% by weight fly ash, preferably approximately 10% to approximately 60% by weight fly ash, preferably approximately 10% to approximately 55% by weight fly ash, preferably approximately 10% to approximately 80% by weight fly ash, preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash, approximately 80% by weight fly ash, approximately 55% by weight fly ash, approximately 60% by weight fly ash, approximately 65% by weight fly ash, approximately 70% by weight fly ash, approximately 75% by weight fly ash, approximately 80% by weight fly ash or any sub-combination thereof. Preferably the fly ash has an average particle size of <10 μm; more preferably 90% or more of the particles have a particles size of <10 μm.

The cementitious material for use in one disclosed embodiment of the present invention can optionally include 0.1% to approximately 10% by weight Wollastonite. Wollastonite is a calcium inosilicate mineral ($CaSiO_3$) that may contain small amounts of iron, magnesium, and manganese substituted for calcium. In addition the cementitious material can optionally include 0.1-25% calcium oxide (quick lime), calcium hydroxide (hydrated lime), calcium carbonate or latex or polymer admixtures, either mineral or synthetic, that have reactive hydroxyl groups.

The cementitious material for use in one disclosed embodiment of the present invention can also optionally include fillers, such as limestone powder; calcium carbonate; titanium dioxide; quartz; or other finely divided minerals that densify the hydrated cement paste. Specifically, inert fillers optionally can be used in the cementitious material of the present invention in amounts of 0% to approximately 40% by weight; preferably, approximately 5% to approximately 30% by weight. In one disclosed embodiment, the cementitious material for use with the present invention comprises 0% to approximately 75% by weight portland cement, approximately 10% to approximately 90% by weight slag cement, approximately 5% to approximately 80% by weight fly ash and 0% to approximately 40% by weight inert filler. In another disclosed embodiment, the cementitious material for use with the present invention comprises approximately 10% to approximately 80% by weight portland cement; at least one of approximately 10% to approximately 90% by weight slag cement and approximately 5% to approximately 80% by weight fly ash; and 5% to approximately 40% by weight inert filler.

In one disclosed embodiment, the cementitious material in accordance with the present invention comprises approximately equal parts by weight of portland cement, slag cement and fly ash; i.e., approximately 33⅓% by weight portland cement, approximately 33⅓% by weight slag cement and approximately 33⅓% by weight fly ash. In another disclosed embodiment, a preferred cementitious material in accordance with the present invention has a weight ratio of portland cement to slag cement to fly ash of 1:1:1. In another disclosed embodiment, the hydraulic cement in accordance with the present invention has a weight ratio of portland cement to slag cement to fly ash of approximately 0.85-1.05:0.85-1.05:0.85-1.05, preferably approximately 0.9-1.1:0.9-1.1:0.9-1.1, more preferably approximately 0.95-1.05:0.95-1.05:0.95-1.05.

In one disclosed embodiment, the cementitious material for use with the present invention comprises approximately 10% to approximately 80% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 70% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 60% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 50% by weight Portland cement, approximately 10% to approximately 90% by weight slag cement, and approximately 5% to approximately 80% by weight fly ash. In another disclosed embodiment, the cementitious material for use with the present invention comprises less than 50% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 45% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 40% by weight Portland cement, approximately 10% to approximately 90% by weight slag cement, and approximately 5% to approximately 80% by weight fly ash. In another disclosed embodiment, the cementitious material for use with the present invention comprises approximately 10% to approximately 35% by weight Portland cement, approximately 10% to approximately 90% by weight slag cement, and approximately 5% to approximately 80% by weight fly ash.

In one disclosed embodiment, the cementitious material for use with the present invention comprises 0% to approximately 100% by weight Portland cement, approximately 10% to approximately 90% by weight slag cement, and approximately 5% to approximately 80% by weight fly ash. In one disclosed embodiment, the cementitious material for use with the present invention comprises 0% to approximately 80% by weight Portland cement, approximately 10% to approximately 90% by weight slag cement, and approximately 5% to approximately 80% by weight fly ash. In another disclosed embodiment, the cementitious material for use with the present invention comprises 0% to approximately 70% by weight Portland cement, approximately 10% to approximately 90% by weight slag cement, and approximately 5% to approximately 80% by weight fly ash. In another disclosed embodiment, the cementitious material for use with the present invention comprises 0% to approximately 60% by weight Portland cement, approximately 10% to approximately 90% by weight slag cement, and approximately 5% to approximately 80% by weight fly ash. In another disclosed embodiment, the cementitious material for use with the present invention comprises 0% to approximately 50% by weight Portland cement, approximately 10% to approximately 90% by weight slag cement, and approximately 5% to approximately 80% by weight fly ash. In another disclosed embodiment, the cementitious material for use with the present invention comprises 0% to approximately 45% by weight Portland cement, approximately 10% to approximately 90% by weight slag cement, and approximately 5% to approximately 80% by weight fly ash. In another disclosed embodiment, the cementitious material for use with the present invention comprises 0% to approximately 40% by weight Portland cement, approximately 10% to approximately 90% by weight slag cement, and approximately 5% to approximately 80% by weight fly ash. In another disclosed embodiment, the cementitious material for use with the present invention comprises 0% to approximately 35% by weight Portland cement, approximately 10% to approximately 90% by weight slag cement, and approximately 5% to approximately 80% by weight fly ash.

In another disclosed embodiment, the cementitious material for use with the present invention comprises approximately 10% to approximately 100% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 90% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 80% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 70% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 60% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 50% by weight Portland cement and at least one of approximately 10% to approximately 90% by weight slag cement and approximately 5% to approximately 80% by weight fly ash. In another disclosed embodiment, the cementitious material for use with the present invention comprises approximately 10% to approximately 40% by weight Portland cement and at least one of approximately 10% to approximately 90% by weight slag cement and approximately 5% to approximately 80% by weight fly ash.

In another disclosed embodiment, the cementitious material for use with the present invention comprises approximately 10% to approximately 90% by weight Portland cement; approximately 10% to approximately 90% by weight slag cement; 0% to approximately 80% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises approximately 10% to approximately 80% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 70% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 60% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 50% by weight Portland cement; approximately 10% to approximately 90% by weight slag cement; 0% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight Portland cement; approximately 10% to approximately 90% by weight slag cement; 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises at least one of approximately 10% to approximately 100% by weight Portland cement, approximately 10% to approximately 90% by weight slag cement and approximately 5% to approximately 80% by weight fly ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises at least one of approximately 10% to approximately 80% by weight Portland cement, approximately 10% to approximately 90% by weight slag cement and approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 70% by weight Portland cement, approximately 10% to approximately 90% by weight slag cement and approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 60% by weight Portland cement, approximately 10% to approximately 90% by weight slag cement and approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 50% by weight Portland cement, approximately 10% to approximately 90% by weight slag cement and approximately 5% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight Portland cement; approximately 10% to approximately 90% by weight slag cement; approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 45% by weight Portland cement, approximately 10% to approximately 90% by weight slag cement and approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 40% by weight Portland cement, approximately 10% to approximately 90% by weight slag cement and approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 35% by weight Portland cement, approximately 10% to approximately 90% by weight slag cement and approximately 10% to approximately 80% by weight fly ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises approximately 10% to approximately 90% by weight Portland cement; at least one of approximately 10% to approximately 90% by weight slag cement and approximately 5% to approximately 80% by weight fly ash; and 0.1% to 10% by weight Wollastonite. In one disclosed embodiment, the cementitious material for use with the present invention comprises approximately 10% to approximately 80% by weight Portland cement; at least one of approximately 10% to approximately 90% by weight slag cement and approximately 5% to approximately 80% by weight fly ash; and 0.1% to approximately 10% by weight Wollastonite. In another disclosed embodiment, the cementitious material for use with the present invention comprises approximately 10% to approximately 70% by weight Portland cement; at least one of approximately 10% to approximately 90% by weight slag cement and approximately 5% to approximately 80% by weight fly ash; and 0.1% to approximately 10% by weight Wollastonite. In another disclosed embodiment, the cementitious material for use with the present invention comprises approximately 10% to approximately 60% by weight Portland cement; at least one of approximately 10% to approximately 90% by weight slag cement and approximately 5% to approximately 80% by weight fly ash; and 0.1% to approximately 10% by weight Wollastonite. In another disclosed embodiment, the cementitious material for use with the present invention comprises approximately 10% to approximately 50% by weight Portland cement; at least one of approximately 10% to approximately 90% by weight slag cement and approximately 5% to approximately 80% by weight fly ash; and 0.1% to approximately 10% by weight Wollastonite. In another disclosed embodiment, the cementitious material for use with the present invention comprises less than 50% by weight Portland cement; at least one of approximately 10% to approximately 90% by weight slag cement and approximately 5% to approximately 80% by weight fly ash; and 0.1% to approximately 10% by weight Wollastonite. In another disclosed embodiment, the cementitious material for use with the present invention comprises approximately 10% to approximately 45% by weight Portland cement; at least one of approximately 10% to approximately 90% by weight slag cement and approximately 5% to approximately 80% by weight fly ash; and 0.1% to approximately 10% by weight Wollastonite. In another disclosed embodiment, the cementitious material for use with the present invention comprises approximately 10% to approximately 40% by weight Portland cement; at least one of approximately 10% to approximately 90% by weight slag cement and approximately 5% to approximately 80% by weight fly ash; and 0.1% to approximately 10% by weight Wollastonite. In another disclosed embodiment, the cementitious material for use with the present invention comprises approximately 10% to approximately 35% by weight Portland cement; at least one of approximately 10% to approximately 90% by weight slag cement and approximately 5% to approximately 80% by weight fly ash; and 0.1% to approximately 10% by weight Wollastonite.

The portland cement, slag cement and fly ash, and any other supplementary cementitious material, can be combined physically or mechanically in any suitable manner and is not a critical feature of the present invention. For example, the portland cement, slag cement and fly ash can be mixed together to form a uniform blend of dry material prior to combining with the aggregate and water. Or, the portland cement, slag cement and fly ash can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the concrete of the present invention. Such chemical admixtures include, but are not limited to, accelerators, retarders, air entrainments, plasticizers, superplasticizers, pigments, corrosion inhibitors, bonding agents and pumping aid. Although chemical admixtures can be used with the concrete of the present invention, it is believed that chemical admixtures are not necessary.

Mineral admixtures or supplementary cementitious materials can also be used with the concrete of the present invention. Such mineral admixtures include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. Although mineral admixtures can be used with the concrete of the present invention, it is believed that mineral admixtures are not necessary.

Electrically heated concrete blankets, such as may be used for the layer of insulating material 40, are commercially available under the designation Powerblanket from Power Blanket LLC, Salt Lake City, Utah.

Concrete insulating blankets, such as may be used for the layer of insulating material 40, are commercially available under the designation concrete insulating blankets from Pregis Corp., Lake Forest, Ill. and concrete curing blankets from Granite City Tool, Waite Park, Minn.

The following examples are illustrative of selected embodiments of the present invention and are not intended to limit the scope of the invention.

Example 1

Six horizontal concrete forms were set up side-by-side to form slabs on grade. The forms were erected outside, on the ground and were subjected to ambient weather and temperature conditions. Three forms were conventional 2 feet×8 feet wood forms. These forms were set for a six-inch thick slab on grade or precast such as tilt-up wall slab. Underneath each form a 6 mil polyethylene plastic sheeting was installed. Concrete placed in the conventional form was placed directly on the plastic sheeting and no covering was placed on the top surface of the concrete, except a 6 mil polyethylene plastic sheet to prevent moisture loss to the air. The other three forms were insulated concrete forms (i.e., Greencraft forms). The insulated concrete forms included conventional wood sides. However, each insulated concrete forms also included two 2 feet×8 feet panels of 4 inch thick expanded polystyrene foam. One of the expanded polystyrene foam panels was placed on the ground and formed the bottom of the form; the other expanded polystyrene foam panel was placed on the top surface of the concrete after the concrete was placed and finished and additional foam pieces were used to insulate the four sides of the 6 inch concrete slab. Thus, in the insulated concrete form, the concrete slab was insulated on the top, sides and bottom with 4 inches of expanded polystyrene foam.

Three different concrete mixes were prepared. The concrete mixes employed three different cement formulations but were otherwise similar. No concrete additives of any kind were used in any of these formulations, except a water-reducing superplasticizer admixture. The three cement formulations are shown in Table 1 below.

TABLE 1

| Formulation No. | portland Cement lbs/yd³ concrete | Slag Cement lbs/yd³concrete | Fly Ash lbs/yd³concrete | Total Cement Weight lbs/yd³concrete |
|---|---|---|---|---|
| 4 | 540 | | 120 | 660 |
| 5 | 325 | | 325 | 650 |
| 6 | 220 | 215 | 215 | 650 |

Concrete made with Formulation No. 1 was placed in both a horizontal conventional form and a horizontal insulated concrete form. Similarly, concrete made with Formulation No. 2 was placed in both a horizontal conventional form and a horizontal insulated concrete form. And, concrete made with Formulation No. 3 was placed in both a horizontal conventional form and a horizontal insulated concrete form, as described above.

Each concrete form was fitted with a temperature sensor with an internal memory and microchip placed at approximately the middle of the six-inch concrete receiving space defined by the form and in the center of the 4 feet by 8 feet form. Another temperature sensor was placed outside the form to record ambient temperatures adjacent the forms. The concrete temperature sensors were Intellirock II™ maturity/temperature loggers from Engius, LLC of Stillwater, Okla. The internal temperature and calculated maturity valued (° C.-Hrs) of the concrete within each form was logged every hour for 90 days.

Figure 7:
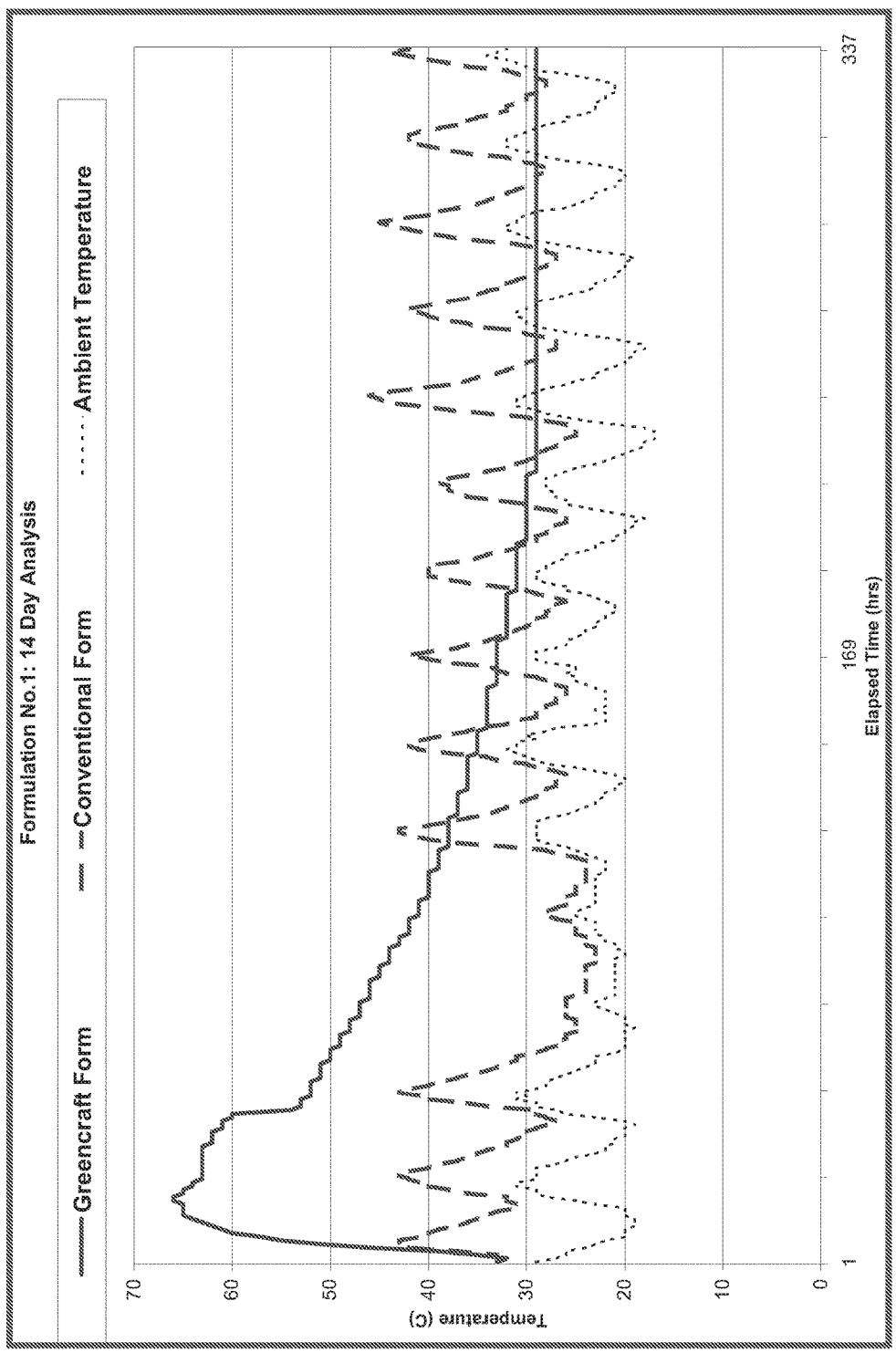
FIG. 7 is a graph of the internal concrete temperature of concrete having a cement mixture of approximately 540 lbs of portland cement (approximately 80% by weight) and 120 lbs of fly ash (approximately 20% by weight) per cubic yard of concrete. The graph shows the internal temperature of this concrete in both a horizontal insulated concrete form (i.e., a Greencraft form) and a horizontal conventional form over a 14-day period. The ambient temperature is also shown.
Figure 10:
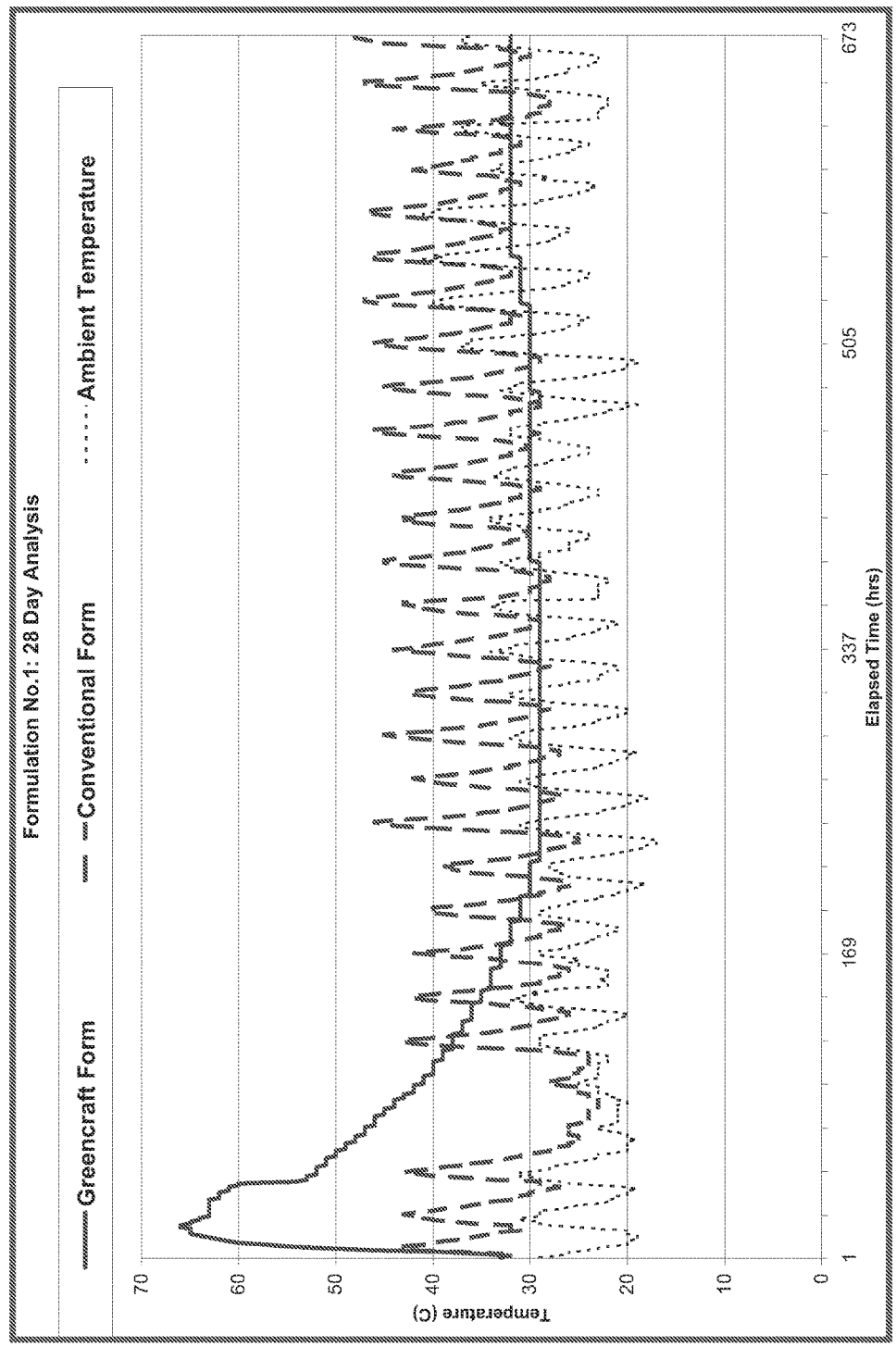
FIG. 10 is a graph of the internal concrete temperature of concrete having a cement mixture of approximately 540 lbs of portland cement (approximately 80% by weight) and 120 lbs of fly ash (approximately 20% by weight) per cubic yard of concrete. The graph shows the internal temperature of this concrete in both a horizontal insulated concrete form (i.e., a Greencraft form) and a horizontal conventional form over a 28-day period. The ambient temperature is also shown.
Figure 13:
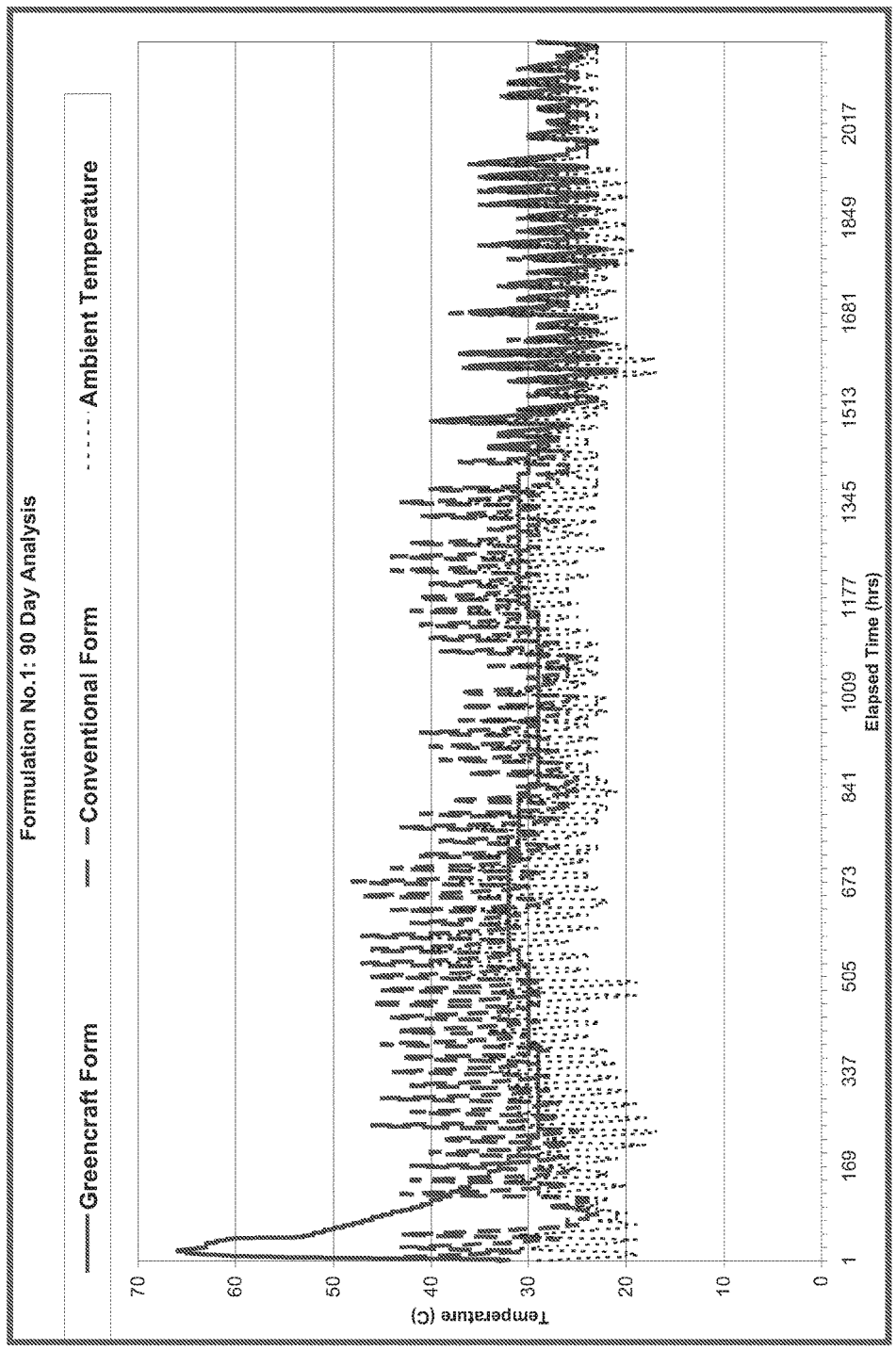
FIG. 13 is a graph of the internal concrete temperature of concrete having a cement mixture of approximately 540 lbs of portland cement (approximately 80% by weight) and 120 lbs of fly ash (approximately 20% by weight) per cubic yard of concrete. The graph shows the internal temperature of this concrete in both a horizontal insulated concrete form (i.e., a Greencraft form) and a horizontal conventional form over a 90-day period. The ambient temperature is also shown.

FIGS. 7, 10 and 13 are graphs of the internal concrete temperature of Formulation No. 1 in both a conventional horizontal concrete form and a horizontal insulated concrete form. The ambient temperature is also shown on the graph.

As can be seen from FIGS. 7, 10 and 13, the concrete made with Formulation No. 1 within the conventional form reached a maximum temperature of approximately 43° C. relatively quickly and returned to approximately ambient temperature within approximately one day. The concrete in the conventional concrete form then fluctuated approximately 3 to 20° C. on a daily basis closely tracking the change in ambient temperature.

The concrete made with Formulation No. 1 within the insulated concrete form reached an internal temperature of 43° C. in about the same amount of time as the concrete in the conventional form. However, while the temperature of the concrete in the conventional form, in direct contact with the ground and exposed to the air, began to drop from its maximum temperature, the temperature of the concrete in the insulated concrete form continued to increase for a relatively long period of time until it reached a maximum temperature of approximately 66° C. The internal temperature of the concrete in the insulated concrete form then slowly declined until it reached ambient temperature after approximately 10 days. For the remainder of the 90-day test period, the internal temperature of the concrete in the insulated concrete form fluctuated little.

Figure 8:
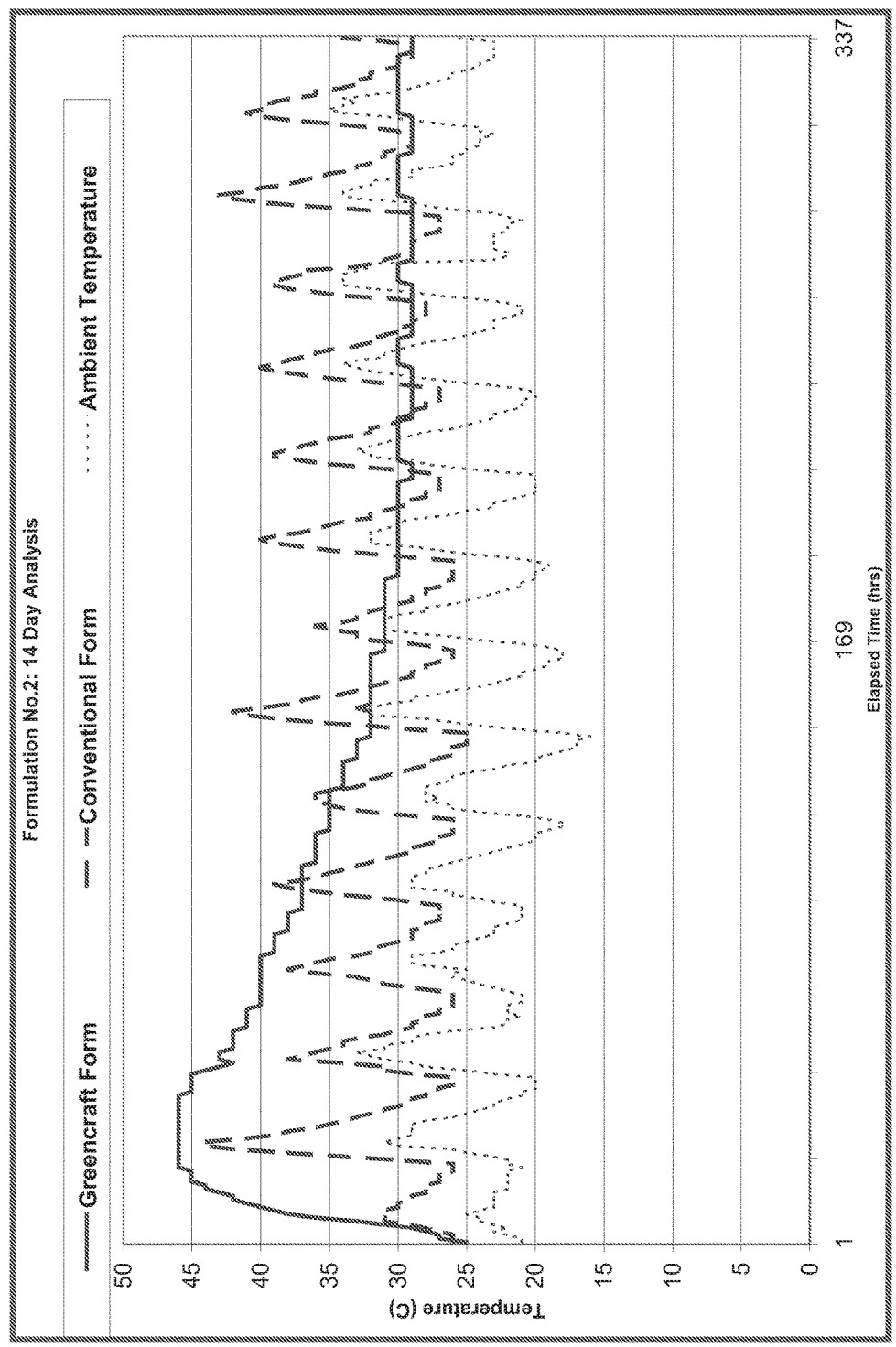
FIG. 8 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a horizontal insulated concrete form (i.e., a Greencraft form) and a horizontal conventional form over a 14-day period.
Figure 11:
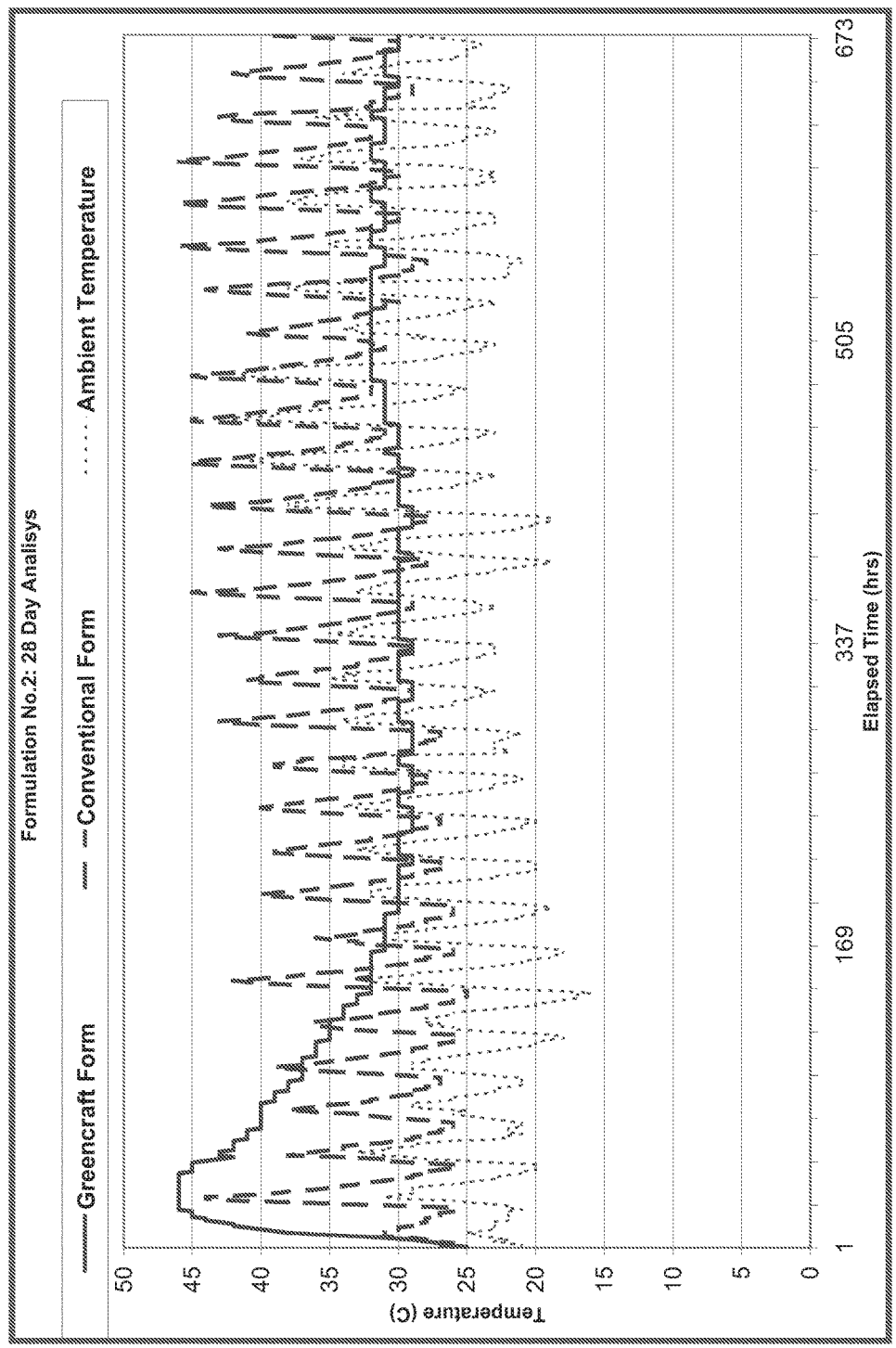
FIG. 11 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a horizontal insulated concrete form (i.e., a Greencraft form) and a horizontal conventional form over a 28-day period.
Figure 14:
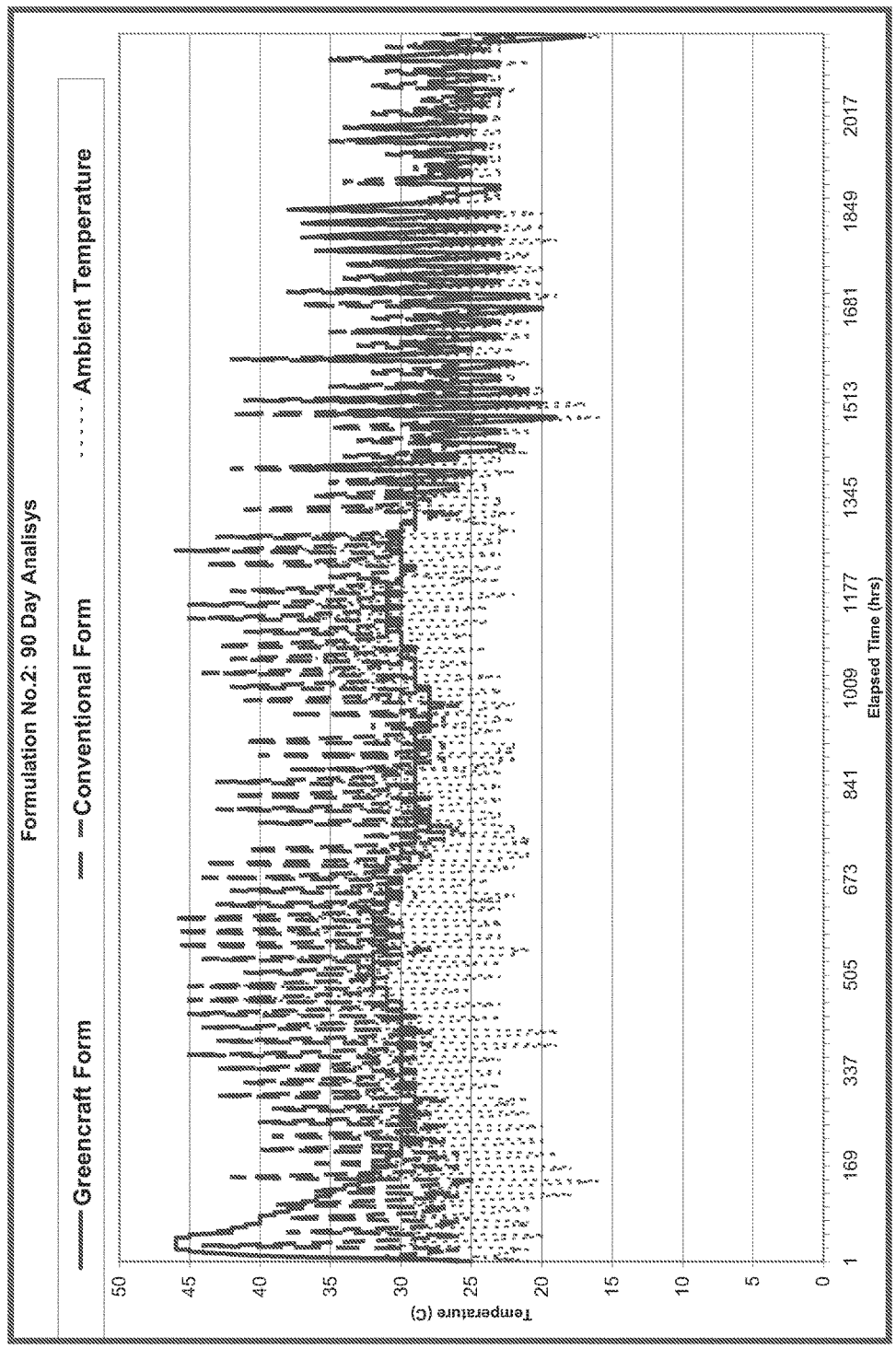
FIG. 14 is a graph of the internal concrete temperature of concrete having a cement mixture of approximately 325 lbs of portland cement (50% by weight) and 325 of lbs of fly ash (50% by weight) per cubic yard of concrete. The graph shows the internal temperature of this concrete in both a horizontal insulated concrete form (i.e., a Greencraft form) and a horizontal conventional form over a 90-day period.

FIGS. 8, 11 and 14 are graphs of the internal concrete temperature of the concrete made with Formulation No. 2 in both a conventional horizontal concrete form and a horizontal insulated concrete form in accordance with the present invention. The ambient temperature is also shown on this graph.

As can be seen from FIGS. 8, 11 and 14, the concrete made with Formulation No. 2 within the conventional form reached a maximum temperature of approximately 31° C. relatively quickly and returned to approximately ambient temperature within approximately one day. The concrete in the conventional concrete form then fluctuated approximately 5 to 18° C. on a daily basis.

The concrete made with Formulation No. 2 within the insulated concrete form reached an internal temperature of 31° C. in about the same amount of time as the concrete in the conventional form. However, while the temperature of the concrete in the conventional form began to drop from its maximum temperature, the temperature of the concrete in the insulated concrete form continued to increase for a relatively long period of time (approximately two days) until it reached a maximum temperature of approximately 46° C. The internal temperature of the concrete in the insulated concrete form then slowly declined until it reached ambient temperature after approximately 6 days. For the remainder of the 90-day test period, the internal temperature of the concrete in the insulated concrete form fluctuated little.

Figure 9:
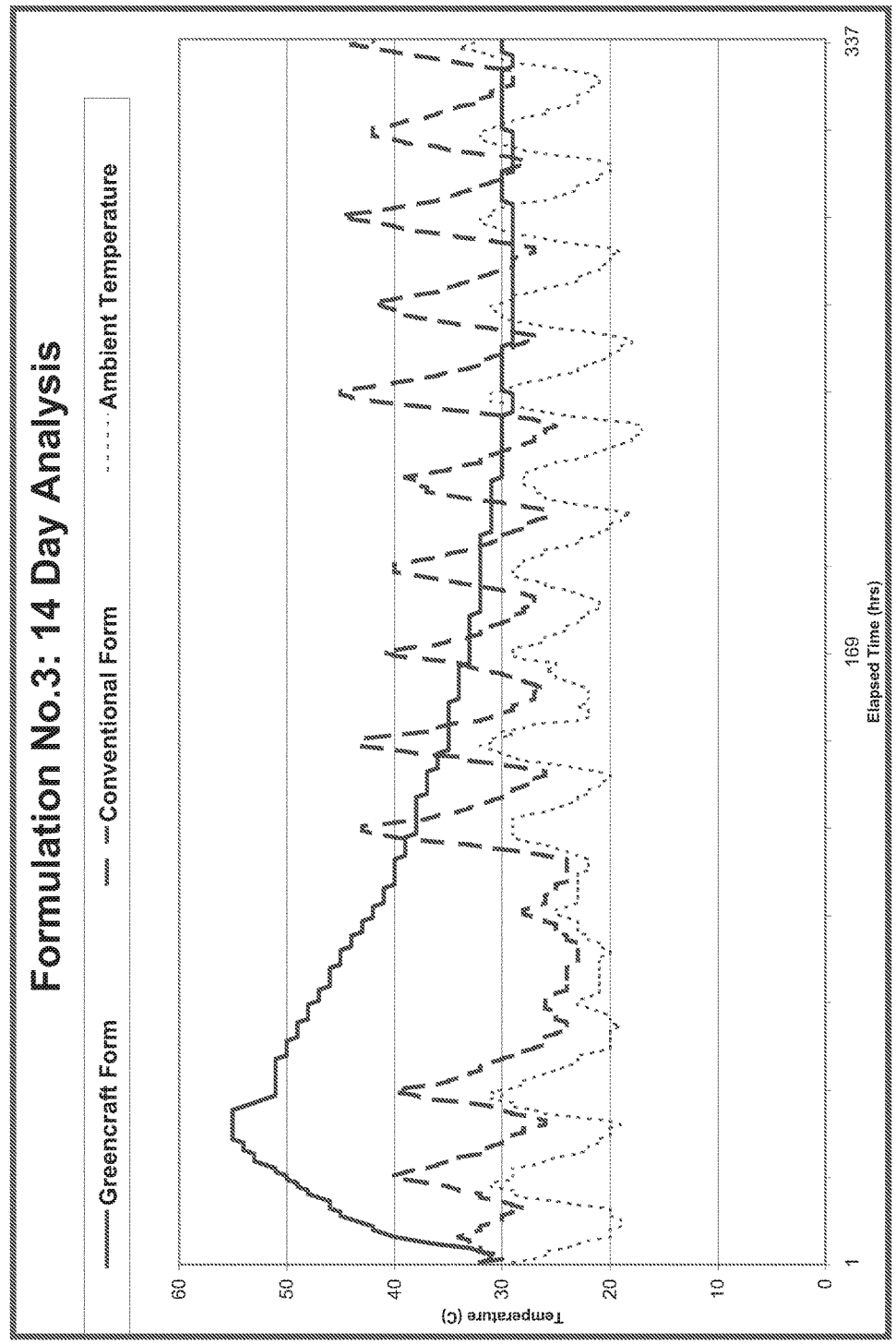
FIG. 9 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a horizontal insulated concrete form (i.e., a Greencraft form) and a horizontal conventional form over a 14-day period. The ambient temperature is also shown.
Figure 12:
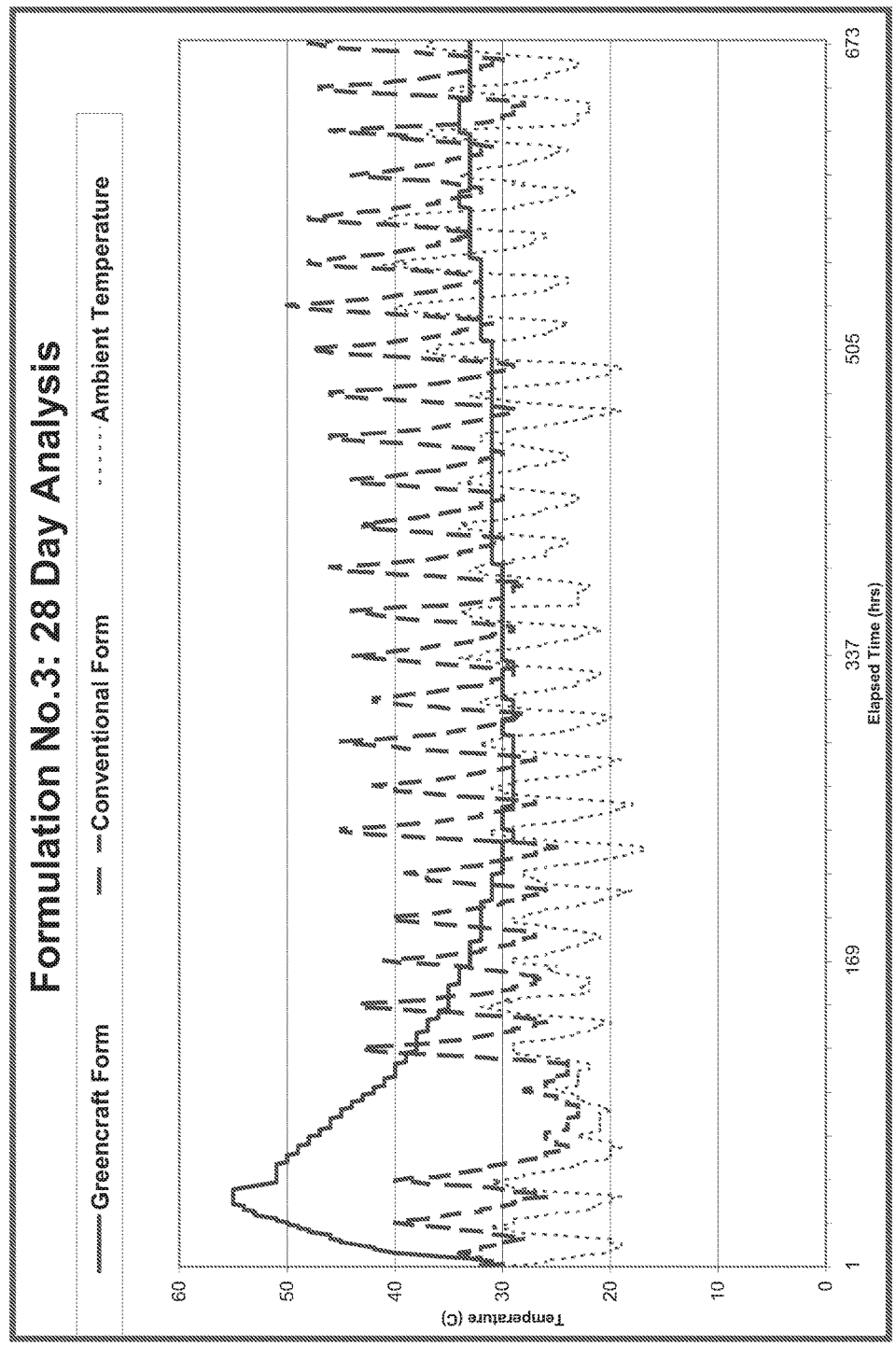
FIG. 12 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a horizontal insulated concrete form (i.e., a Greencraft form) and a horizontal conventional form over a 28-day period. The ambient temperature is also shown.
Figure 15:
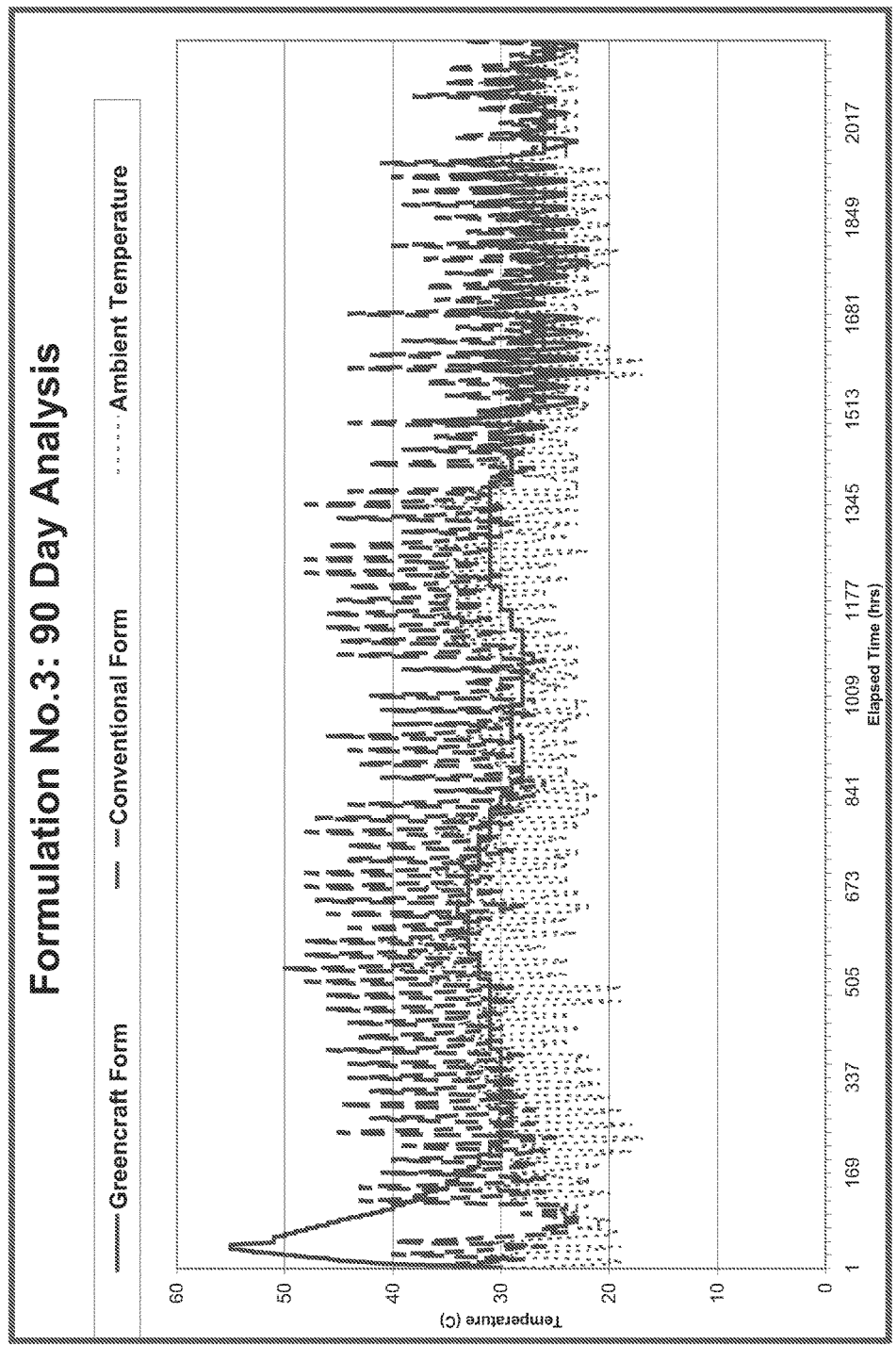
FIG. 15 is a graph of the internal concrete temperature of concrete having a cement mixture of approximately 220 lbs of portland cement (approximately 34% by weight), 215 lbs of slag cement (approximately 33% by weight) and 215 of lbs of fly ash (approximately 33% by weight) per cubic yard of concrete. The graph shows the internal temperature of this concrete in both a horizontal insulated concrete form (i.e., a Greencraft form) and a horizontal conventional form over a 90-day period. The ambient temperature is also shown.

FIGS. 9, 12 and 15 is a graph of the internal concrete temperature of concrete made with Formulation No. 3 in both a conventional horizontal concrete form and a horizontal insulated concrete form in accordance with the present invention. The ambient temperature is also shown on this graph.

As can be seen from FIGS. 9, 12 and 15, the concrete made with Formulation No. 3 within the conventional form reached a maximum temperature of approximately 35° C. relatively quickly and returned to approximately ambient temperature within approximately one day. The concrete in the conventional concrete form then fluctuated approximately 3 to 20° C. on a daily basis.

The concrete made with Formulation No. 3 within the insulated concrete form reached an internal temperature of 35° C. in about the same amount of time as the concrete in the conventional form. However, while the temperature of the concrete in the conventional form began to drop from its maximum temperature, the temperature of the concrete in the insulated concrete form continued to increase for a relatively long period of time (approximately 1.5 days) until it reached a maximum temperature of approximately 55° C. The internal temperature of the concrete in the insulated concrete form then slowly declined until it reached ambient temperature after approximately 10 days. For the remainder of the 90-day test period, the internal temperature of the concrete in the insulated concrete form fluctuated little.

Concrete maturity or "equivalent age" is graphically represented by the area under the curves of the graphs shown in FIGS. 7-15. Therefore, if the area under the curve has a greater area, it will also have a greater concrete maturity or equivalent age and therefore greater compressive strength and correspondingly greater flexural strength and modulus of rupture. For example, in FIG. 7 it can easily be seen that the area under the curve for Formulation No. 1 in the insulated Greencraft form is greater than the area under the curve for Formulation No. 1 in the non-insulated form. As similar analysis can easily be made for the other concrete formulations shown in FIGS. 7-15.

Example 2

Maturity of concrete is measured as "equivalent age" and is given in temperature degrees×hours (either ° C.-Hrs or ° F.-Hrs). Maturity of concrete has became a useful tool in predicting the strength of concrete, particularly at ages earlier than 28 days and is related to the time and curing conditions, especially temperature. In this way, the maturity concept is also related to the rate of hydration and the rate of strength gain for a particular mix design.

The concrete maturity for the six horizontal slabs identified above in Example 1 was measured by the Intellirock II™ maturity/temperature loggers. A summary of this test data is shown in Table 2 below.

3959° C.-Hrs or 63% greater concrete maturity for the concrete in the insulated concrete form. Similarly, at day 7 Formulation No. 1 in the conventional form had a maturity of 5237° C.-Hrs; whereas, Formulation No. 1 in the insulated form had a maturity of 7650° C.-Hrs or 46% greater concrete maturity for the concrete in the insulated concrete form.

At day 2 Formulation No. 2 in the conventional form had a maturity of 1481° C.-Hrs; whereas, Formulation No. 2 in the insulated form had a maturity of 2044° C.-Hrs or 38% greater concrete maturity for the concrete in the insulated concrete form. For example, at day 3 Formulation No. 2 in the conventional form had a maturity of 2213° C.-Hrs; whereas, Formulation No. 2 in the insulated form had a maturity of 3036° C.-Hrs or 37% greater concrete maturity for the concrete in the insulated concrete form. Similarly, at day 7 Formulation No. 2 in the conventional form had a maturity of 5232° C.-Hrs; whereas, Formulation No. 2 in the insulated form had a maturity of 6404° C.-Hrs or 22% greater concrete maturity for the concrete in the insulated concrete form.

At day 2 Formulation No. 3 in the conventional form had a maturity of 1550° C.-Hrs; whereas, Formulation No. 3 in the insulated form had a maturity of 2293° C.-Hrs or 13% greater concrete maturity for the concrete in the insulated concrete form. For example, at day 3 Formulation No. 3 in the conventional form had a maturity of 2232° C.-Hrs; whereas, Formulation No. 3 in the insulated form had a

TABLE 2

ASTM C-42 Horizontal Forms Field Coring Conventional vs. Greencraft Forms Testing: Concrete Maturity (° C.-Hrs)

| Maturity Age | | Formulation No. 1 | | Formulation No. 2 | | Formulation No. 3 | |
| --- | --- | --- | --- | --- | --- | --- | --- |
| | | Conventional Form | Insulated Greencraft | Conventional Form | Insulated Greencraft | Conventional Form | Insulated Greencraft |
| Age (days) | Age (hours) | Maturity ° C.-Hrs | Maturity ° C.-Hrs | Maturity ° C.-Hrs | Maturity ° C.-Hrs | Maturity ° C.-Hrs | Maturity ° C.-Hrs |
| 0.33 | 8 | 308 | 362 | 229 | 249 | 256 | 276 |
| 0.75 | 18 | 652 | 1001 | 516 | 674 | 558 | 720 |
| 1 | 24 | 886 | 1386 | 685 | 948 | 772 | 1012 |
| 2 | 48 | 1711 | 2774 | 1481 | 2044 | 1550 | 2293 |
| 3 | 72 | 2424 | 3959 | 2213 | 3036 | 2232 | 3484 |
| 7 | 168 | 5237 | 7650 | 5232 | 6406 | 5066 | 7226 |
| 14 | 336 | 10822 | 12625 | 10629 | 11395 | 10701 | 12297 |
| 28 | 672 | 22912 | 22919 | 22449 | 21752 | 22999 | 22969 |
| 56 | 1344 | 44396 | 43137 | 44655 | 41532 | 46295 | 42944 |
| 90 | 2160 | 67038 | 65879 | 68541 | 63373 | 71066 | 65303 |

The test data in Table 2 above shows greater concrete maturity for the concrete cured in the insulated concrete forms compared to the same concrete formulation cured in the conventional form. For example, at day 1 Formulation No. 1 in the conventional form had a maturity of 886° C.-Hrs; whereas, Formulation No. 1 in the insulated form had a maturity of 1386° C.-Hrs or 56% greater concrete maturity for the concrete in the insulated concrete form. At day 2 Formulation No. 1 in the conventional form had a maturity of 1711° C.-Hrs; whereas, Formulation No. 1 in the insulated form had a maturity of 2774° C.-Hrs or 62% greater concrete maturity for the concrete in the insulated concrete form. At day 3 Formulation No. 1 in the conventional form had a maturity of 2424° C.-Hrs; whereas, Formulation No. 1 in the insulated form had a maturity of maturity of 3484° C.-Hrs or 56% greater concrete maturity for the concrete in the insulated concrete form. Similarly, at day 7 Formulation No. 3 in the conventional form had a maturity of 5066° C.-Hrs; whereas, Formulation No. 3 in the insulated form had a maturity of 7226° C.-Hrs or 42% greater concrete maturity for the concrete in the insulated concrete form.

Example 3

In accordance with ASTM 42, cored samples of the concrete from each different form described above in Example 1 were cored and tested by an independent, accredited concrete testing laboratory for determining compressive strength according to ASTM C-39. The cored samples of the concrete were tested at 3 days, 7 days, 28 days and 90 days. A summary of this test data is shown below in Table 3 below.

TABLE 3

| Formulation No. | Horizontal Form Type | Compressive Strength (psi) | | | |
|---|---|---|---|---|---|
| | | 3 days | 7 days | 28 days | 90 days |
| 1 | Insulated | 4,080 | 4,700 | 4,530 | 5,640 |
|   | Conventional | 3,130 | 3,510 | 4,840 | 5,490 |
| 2 | Insulated | 2,220 | 2,830 | 3,670 | 4,860 |
|   | Conventional | 1,360 | 1,900 | 4,920 | 5,830 |
| 3 | Insulated | 3,020 | 3,780 | 4,390 | 4,860 |
|   | Conventional | 1,150 | 2,570 | 4,200 | 4,390 |

The test data in Table 3 above surprisingly and unexpectedly shows that the formulations in the insulated concrete forms achieved better strength, and particularly much better early concrete strength, than the same concrete in the conventional forms. Specifically, at day 3 Formulation No. 1 had 30% higher compressive strength in the insulated concrete form compared to Formulation No. 1 in the conventional concrete form. At day 3 Formulation No. 2 had 63% higher compressive strength in the insulated concrete form compared to Formulation No. 2 in the conventional concrete form. And, at day 3 Formulation No. 3 had 162% higher compressive strength in the insulated concrete form compared to Formulation No. 3 in the conventional concrete form.

At day 7 Formulation No. 1 had 34% higher compressive strength in the insulated concrete form compared to Formulation No. 1 in the conventional concrete form. At day 7 Formulation 2 had 49% higher compressive strength in the insulated concrete form compared to Formulation No. 2 in the conventional concrete form. And, at day 7 Formulation No. 3 had 47% higher compressive strength in the insulated concrete form compared to Formulation No. 3 in the conventional concrete form.

At day 28 the results for Formulation Nos. 1 and 2 appear to be an anomaly or incorrect. At day 28 Formulation No. 3 had 4.5% higher compressive strength in the insulated concrete form compared to Formulation No. 3 in the conventional concrete form.

At day 90 Formulation No. 1 had 2.7% higher compressive strength in the insulated concrete form compared to Formulation No. 1 in the conventional concrete form. At day 90 the results for Formulation No. 2 appear to be an anomaly or incorrect. And, at day 90 Formulation No. 3 had 10% higher compressive strength in the insulated concrete form compared to Formulation No. 3 in the conventional concrete form.

Example 4

Sample cylinders of each of the three concrete formulation listed in Example 1 above were prepared by an independent, accredited concrete testing laboratory, cured under laboratory conditions and tested for compressive strength according to ASTM C-39. These test cylinders were prepared from the same concrete used to form the test panels discussed above in Examples 2 and 3 above. A summary of this test data is shown below in Table 4 below. In addition to the numerous testing cylinders used for testing compressive strength at various points in time, for each of the three concrete formulations two cylinders were fitted each with an Intellirock JJ™ maturity/temperature loggers and cured with the testing cylinders. Therefore, all cylinders were made and cured under the same conditions. At each point in time two cylinders were tested for compressive strength and the results were averaged.

TABLE 4

| ASTM C-39 Lab Curing and Testing: Compressive Strength | | | | | | | |
|---|---|---|---|---|---|---|---|
| | | Formulation 1 (540 lbs OPC, 120 lbs FA) | | Formulation 2 (325 lbs OPC, 325 lbs FA) | | Formulation 3 (220 lbs OPC, 215 lbs SC, 215 lbs FA) | |
| Testing Age | | Compressive | Average Compressive | Compressive | Average Compressive | Compressive | Average Compressive |
| Age (days) | Age (hours) | Strength (psi) | Strength (psi) | Strength (psi) | Strength (psi) | Strength (psi) | Strength (psi) |
| 0.33 | 8 | 290 | 300 | 140 | 140 | 0 | 0 |
| | | 310 | | 140 | | 0 | |
| 0.75 | 18 | 1190 | 1190 | 445 | 450 | 210 | 210 |
| | | 1190 | | 450 | | 210 | |
| 1 | 24 | 1190 | 1300 | 520 | 530 | 210 | 220 |
| | | 1410 | | 530 | | 220 | |
| 2 | 48 | 1760 | 1860 | 840 | 840 | 300 | 320 |
| | | 1950 | | 840 | | 330 | |
| 3 | 72 | 2560 | 2410 | 960 | 950 | 430 | 450 |
| | | 2260 | | 940 | | 470 | |
| 7 | 168 | 2800 | 2930 | 1140 | 1190 | 710 | 660 |
| | | 3060 | | 1240 | | 610 | |
| 14 | 336 | 3440 | 3370 | 1600 | 1560 | 1130 | 1100 |
| | | 3300 | | 1510 | | 1070 | |
| 28 | 672 | 5630 | 5555 | 2210 | 2180 | 3700 | 3830 |
| | | 5480 | | 2150 | | 3960 | |
| 56 | 1344 | 6010 | 5960 | 3050 | 3080 | 6430 | 6530 |
| | | 5910 | | 3100 | | 6620 | |
| 90 | 2160 | 7410 | 7360 | 3780 | 3695 | 7480 | 7310 |
| | | 7310 | | 3610 | | 7140 | |

The test results in Table 4 show that the concrete formulations in accordance with the present invention have very poor early strength when cured according to ASTM C-39; i.e., at 72° F. under water. For example, at day 3, the cylinders made from Formulation No. 1 had an average compressive strength of 2410 psi. At day 3, the cylinders made from Formulation No. 22 had an average compressive strength of 950 psi. At day 3, the cylinders made from Formulation No. 3 had an average compressive strength of 450 psi. Construction practice requires that concrete have at least 2500 psi before concrete forms can be stripped and generally the specified compressive strength at 28 days until the full designed loads can be placed on concrete slabs, roads, runways, etc. Generally aviation runway specification or road paving specifications require a minimum of 3,500 to 4,400 psi compressive strength concrete at 28 days. Concrete made with Formulation Nos. 2 and 3, cured in the laboratory at 72° F. under water and tested in accordance to the ASTM C-39, achieved the necessary compressive strength required for the form to be stripped at approximately 14 to 20 days depending on the mix. Also, concrete made with Formulation Nos. 2 and 3, cured in the laboratory at 72° F. under water and tested in accordance to the ASTM C-39, achieved the necessary compressive strength required to allow loads to be placed upon them at approximately 28 to 56 days depending on the mix. Based on this data, a building slab, road, bridge or aviation runway would take many times longer to build and the cost associated with such schedule delays waiting for concrete to gain sufficient strength would increase significantly. While concrete mixes made of Formulation 1 may generally be specified and can be used in current construction practices, concrete made of Formulation Nos. 2 and 3 are usually never specified or used in conventional construction practice. Of course, concrete made of Formulation No. 1 placed in an insulated form will have a greater maturity or equivalent age and therefore strength gain at day 3 compared with the same concrete formulation placed in a conventional form. This increase in maturity or equivalent age, and corresponding increased in strength, will help accelerate construction schedules and it will replace additional costly additive used to otherwise achieve the same strength when placed in a state of the art form (conventional/non-insulated) used in current construction practice. These tests clearly demonstrate why the concrete formulations of the present invention, especially Formulation Nos. 2 and 3, are not often, if ever, used in current construction practice.

Example 5

The concrete maturity for each of the three concrete formulation test cylinders cured according to ASTM C-39 as shown in Example 4 above was measured by the Intellirock II™ maturity/temperature loggers. A summary of this test data is shown below in Table 5 below.

TABLE 5

| ASTM C-39 Lab Curing and Testing: Concrete Maturity (° C.-Hrs) | | | | | | |
|---|---|---|---|---|---|---|
| Maturity Age | | Formulation No. 1 (540 lbs OPC, 120 lbs FA) | | Formulation No. 2 (325 lbs OPC, 325 lbs FA) | | Formulation No. 3 (220 lbs PC, 215 lbs SC, 215 lbs FA) |
| Age (days) | Age (hours) | Temp. ° C. | Maturity ° C.-Hrs | Temp. ° C. | Maturity ° C.-Hrs | Temp. ° C. | Maturity ° C.-Hrs |
| 0.33 | 8 | 32 | 218.5 | 28 | 205.5 | 26 | 199 |
| 0.75 | 18 | 22.5 | 495.5 | 22.5 | 459.5 | 22 | 464.5 |
| 1 | 24 | 21.5 | 623 | 21 | 586.5 | 21 | 570 |
| 2 | 48 | 18.5 | 1070.5 | 21.5 | 1091.5 | 19 | 1018.5 |
| 3 | 72 | 19 | 1523.5 | 21.5 | 1615.5 | 19 | 1474 |
| 7 | 168 | 17.5 | 3263.5 | 21 | 3570.5 | 18 | 3220 |
| 14 | 336 | 14 | 5918.5 | 21 | 7050 | 14 | 5882.5 |
| 28 | 672 | 23 | 13544.5 | 23 | 14277 | 23 | 13485 |
| 56 | 1344 | 24 | 29422.5 | 21 | 29117 | 24 | 29279 |
| 90 | 2160 | 22.5 | 48615 | 21 | 46671.5 | 22 | 48429 |

A comparison of the maturity, or the equivalent age, of three concrete formulations cured in the test cylinders according to ASTM C-39 and the maturity of the three concrete formulations cured in the insulated concrete form, shown in Example 2 above, dramatically demonstrate that the concrete cured in the insulated concrete form matured or aged much faster. For example, at day 3 for Formulation No. 1 the ASTM C-39 cylinder had a maturity, or equivalent age, of 1523.5° C.-Hrs; whereas, Formulation No. 1 in the insulated concrete form had a maturity, or equivalent age, of 3959° C.-Hrs (Table 2). At day 3 for Formulation No. 2 the ASTM C-39 cylinder had a maturity, or equivalent age, of 1615.5° C.-Hrs; whereas, Formulation No. 2 in the insulated concrete form had a maturity, or equivalent age, of 3036° C.-Hrs (Table 2). At day 3 for Formulation No. 3 the ASTM C-39 cylinder had a maturity, or equivalent age, of 1474° C.-Hrs; whereas, Formulation No. 3 in the insulated concrete form had a maturity, or equivalent age, of 3484° C.-Hrs (Table 2). Clearly, the insulated concrete form in accordance with the present invention accelerates the curing process of concrete. This accelerated concrete curing or aging is believed to be caused by, inter alia, retaining the heat of hydration through the use of an insulated concrete form. The use of insulated concrete forms thus makes it practical to use concrete mixes and formulations using substantial amounts of recycled supplementary cementitious materials, such as fly ash and slag cement, while still being able to cure and achieve compressive strengths demanded by current construction projects and schedules which otherwise could not be obtained using state of the art concrete forms (i.e., conventional/non-insulated). Based on this data, a building would take many times longer to build and the cost associated with the schedule delays waiting for concrete to gain strength would increase significantly. While concrete mixes made of Formulation No. 1 may generally be specified and can be used in current construction practices, concrete made of Formulation Nos. 2 and 3 are never specified or used in current construction practices. Of course, concrete made of Formulation No. 1 placed in an insulated form will have a greater maturity or equivalent age and therefore strength gain at day 3 compared with the same concrete formulation placed in a conventional form. This increase in maturity or equivalent age, and corresponding increased in strength, will help accelerate construction schedules and it will replace additional costly additive used to otherwise achieve the same strength when placed in a state of the art form (conventional/non-insulated) used in current construction practice. Specifically, for tight schedules for road and airport construction the system of the present invention will help improve delivery time without the use of additional portland cement or expensive additives. These tests clearly demonstrate why the concrete formulations of the present invention, especially Formulation Nos. 2 and 3, are not often, if ever, used in current construction practice.

Example 12

A comparison of the concrete maturity, or equivalent age, data from the actual cored test for the horizontal forms shown in Table 2 above and the C-39 laboratory cylinder test data shown in Table 3 at Day 3 is summarized in Table 6 below.

TABLE 6

Concrete Maturity (° C.-Hrs) at Day 3: Horizontal Forms vs. Laboratory Test Cylinders

| Day 3 | Formulation No. 1 | | Formulation No. 2 | | Formulation No. 3 | |
|---|---|---|---|---|---|---|
| | Conventional Form Maturity ° C.-Hrs | Insulated Greencraft Maturity ° C.-Hrs | Conventional Form Maturity ° C.-Hrs | Insulated Greencraft Maturity ° C.-Hrs | Conventional Greencraft Maturity ° C.-Hrs | Insulated Greencraft Maturity ° C.-Hrs |
| Table 2 | 2424 | 3959 | 2213 | 3036 | 2232 | 3484 |
| Table 3 | 1523 | | 1615 | | 1474 | |
| % Difference | 59% | 160% | 37% | 88% | 51% | 136% |

This data clearly shows that the three concrete formulations in the horizontal insulated concrete forms all had improved maturity ranging from 88% to 160% compared to the three concrete formulations in the cylinders cured according to ASTM C-39. Conversely, all three formulations cured in the horizontal non-insulated forms (i.e., Greencraft forms) had improved maturity ranging from only 37% to 59% compared to the same three formulations cured in the laboratory cylinders in accordance with ASTM C-39.

A comparison of the concrete maturity, or equivalent age, data from the actual cored test for the horizontal forms shown in Table 2 above and the C-39 laboratory cylinder test data shown in Table 3 at Day 7 is summarized in Table 7 below.

TABLE 7

Concrete Maturity (° C.-Hrs) at Day 7: Horizontal Forms vs. Laboratory Test Cylinders

| Day 7 | Formulation No. 1 | | Formulation No. 2 | | Formulation No. 3 | |
|---|---|---|---|---|---|---|
| | Conventional Form Maturity ° C.-Hrs | Insulated Greencraft Maturity ° C.-Hrs | Conventional Form Maturity ° C.-Hrs | Insulated Greencraft Maturity ° C.-Hrs | Conventional Form Maturity ° C.-Hrs | Insulated Greencraft Maturity ° C.-Hrs |
| Table 2 | 5237 | 7650 | 5232 | 6406 | 5066 | 7226 |
| Table 3 | 3263 | | 3570 | | 3220 | |
| % Difference | 60% | 134% | 46% | 79% | 57% | 124% |

This data clearly shows that the three concrete formulations in the horizontal insulated concrete forms all had improved maturity ranging from 79% to 134% compared to the three concrete formulations in the cylinders cured according to ASTM C-39. Conversely, all three formulations cured in the horizontal non-insulated forms (i.e., Greencraft forms) had improved maturity ranging from only 46% to 60% compared to the same three formulations cured in the laboratory cylinders in accordance with ASTM C-39.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method comprising:
   placing a plastic cementitious material in an insulated concrete form, wherein the cementitious material consists essentially of:
      approximately 30% to approximately 80% by weight portland cement, the remaining cementitious material comprising one or more pozzolanic materials; and
      allowing the cementitious material to at least partially cure in the insulated concrete form such that the temperature of the cementitious material, when plotted versus time, forms an initially ascending curve followed by a descending curve, wherein the descending curve lasts for greater than or equal to 24 hours.

2. The method of claim 1, wherein the descending curve lasts for greater than or equal to 48 hours.

3. The method of claim 1, wherein the one or more pozzolanic materials are slag cement, fly ash, silica fume, rice husk ash, metakaolin, or other siliceous, aluminous or aluminosiliceous materials that react with calcium hydroxide in the presence of water.

4. The method of claim 1, wherein the portland cement comprises approximately 30% to approximately 70% by weight portland cement.

5. The method of claim 1, wherein the portland cement comprises approximately 30% to approximately 60% by weight portland cement.

6. The method of claim 1, wherein the portland cement comprises approximately 30% to approximately 50% by weight portland cement.

7. The method of claim 1, wherein the insulated concrete form has an R-value of greater than 4.

8. The method of claim 1, wherein the insulated concrete form has an R-value of greater than 8.

9. The method of claim 1, wherein the insulated concrete form comprises a pair of rectangular, vertically oriented insulating layers horizontally spaced from each other.

10. The method of claim 1, wherein the insulated concrete form comprises a pair of rectangular, horizontally oriented insulating layers vertically spaced from each other.

11. A method comprising:
 placing a plastic cementitious material in an insulated concrete form, wherein the cementitious material consists essentially of:
  approximately 30% to approximately 80% by weight portland cement, the remaining cementitious material comprising one or more pozzolanic materials; and
 allowing the cementitious material to at least partially cure in the insulated concrete form such that the temperature of the cementitious material achieves a temperature greater than the same cementitious material would achieve in a non-insulated concrete form and the temperature remains at a greater temperature for a time greater than or equal to 24 hours.

12. The method of claim 11, wherein the portland cement comprises approximately 30% to approximately 70% by weight portland cement.

13. The method of claim 11, wherein the portland cement comprises approximately 30% to approximately 60% by weight portland cement.

14. The method of claim 11, wherein the portland cement comprises approximately 30% to approximately 50% by weight portland cement.

15. The method of claim 11, wherein the insulated concrete form has an R-value of greater than 4.

16. The method of claim 11, wherein the insulated concrete form has an R-value of greater than 8.

17. A method comprising:
 placing a plastic cementitious material in an insulated concrete form, wherein the cementitious material consists essentially of:
  approximately 30% to approximately 80% by weight portland cement, the remaining cementitious material comprising one or more pozzolanic materials; and
 allowing the cementitious material to at least partially cure in the insulated concrete form such that the temperature of the cementitious material, when plotted versus time, forms an initially ascending curve followed by a descending curve, wherein the temperature of the cementitious material achieves a temperature greater than the same cementitious material would achieve in a non-insulated concrete form and remains at a greater temperature for a time greater than or equal to 24 hours and wherein the descending curve lasts for greater than or equal to 24 hours.

18. The method of claim 17, wherein the portland cement comprises approximately 30% to approximately 60% by weight portland cement.

19. The method of claim 17, wherein the portland cement comprises approximately 30% to approximately 50% by weight portland cement.

20. The method of claim 17, wherein the insulated concrete form has an R-value of at least 4.

\* \* \* \* \*